US010978056B1

(12) United States Patent
Challa et al.

(10) Patent No.: US 10,978,056 B1
(45) Date of Patent: Apr. 13, 2021

(54) GRAMMATICALITY CLASSIFICATION FOR NATURAL LANGUAGE GENERATION IN ASSISTANT SYSTEMS

(71) Applicant: Facebook, Inc., Menlo Park, CA (US)

(72) Inventors: Ashwini Challa, Mountain View, CA (US); Anusha Balakrishnan, Santa Clara, CA (US); Rajen Subba, San Carlos, CA (US); Kartikeya Upasani, Sunnyvale, CA (US); Shawn C. P. Mei, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 188 days.

(21) Appl. No.: 16/264,173

(22) Filed: Jan. 31, 2019

Related U.S. Application Data

(60) Provisional application No. 62/660,876, filed on Apr. 20, 2018, provisional application No. 62/749,608, filed on Oct. 23, 2018.

(51) Int. Cl.
  *G10L 15/19* (2013.01)
  *G10L 15/22* (2006.01)
  (Continued)

(52) U.S. Cl.
  CPC ............ *G10L 15/19* (2013.01); *G06F 16/338* (2019.01); *G06F 16/3329* (2019.01);
  (Continued)

(58) Field of Classification Search
  CPC ....... G10L 15/19; G10L 15/063; G10L 15/22; G10L 2015/0631; G10L 2015/225;
  (Continued)

(56) References Cited

U.S. PATENT DOCUMENTS 7,124,123 B1  10/2006  Roskind
7,158,678 B2   1/2007  Nagel
(Continued)

FOREIGN PATENT DOCUMENTS

AU   2017203668    1/2018
EP     2530870    12/2012
(Continued)

OTHER PUBLICATIONS

Hang Ren, Weiqun Xu, Yan Zhang, Yonghong Yan, "Dialog State Tracking using Conditional Random Fields", Aug. 22-24, 2013, Proceedings of the SIGDIAL 2013 Conference, Association for Computational Linguistics, pp. 457-461 (Year: 2013).*

(Continued)

*Primary Examiner* — Eric Yen
(74) *Attorney, Agent, or Firm* — Baker Botts L.L.P.

(57) ABSTRACT

In one embodiment, a method includes receiving a user input from a client system associated with a user, generating a plurality of candidate responses by a natural-language generation module in response to the user input, determining a quality-indication by a filtering module for each candidate response of the plurality of candidate responses based on one or more classification models and one or more classification rules, wherein the classification models and classification rules are based on one or more acceptance-criteria, selecting one or more candidate responses from the plurality of candidate responses based on their respective quality-indications, ranking the selected candidate responses based on one or more ranking-criteria, and sending instructions for presenting a top-ranked candidate response to the user to the client system associated with the user responsive to receiving the user input.

18 Claims, 12 Drawing Sheets

(51) Int. Cl.

| | | |
|---|---|---|
| *G10L 15/06* | (2013.01) | |
| *G06N 20/00* | (2019.01) | |
| *G06F 16/9035* | (2019.01) | |
| *G06F 16/338* | (2019.01) | |
| *G06F 40/56* | (2020.01) | |
| *G06F 16/332* | (2019.01) | |
| *G06F 16/33* | (2019.01) | |

(52) U.S. Cl.
CPC ...... *G06F 16/3344* (2019.01); *G06F 16/9035* (2019.01); *G06F 40/56* (2020.01); *G06N 20/00* (2019.01); *G10L 15/063* (2013.01); *G10L 15/22* (2013.01); *G10L 2015/0631* (2013.01); *G10L 2015/225* (2013.01)

(58) Field of Classification Search
CPC . G06N 20/00; G06F 16/3329; G06F 16/3344; G06F 16/338; G06F 16/9035; G06F 40/56
See application file for complete search history.

(56) References Cited

U.S. PATENT DOCUMENTS

| | | | |
|---|---|---|---|
| 7,397,912 | B2 | 7/2008 | Aasman |
| 8,027,451 | B2 | 9/2011 | Arendsen |
| 8,560,564 | B1 | 10/2013 | Hoelzle |
| 8,677,377 | B2 | 3/2014 | Cheyer |
| 8,935,192 | B1 | 1/2015 | Ventilla |
| 8,983,383 | B1 | 3/2015 | Haskin |
| 9,154,739 | B1 | 10/2015 | Nicolaou |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,472,206 | B2 | 10/2016 | Ady |
| 9,479,931 | B2 | 10/2016 | Ortiz |
| 9,576,574 | B2 | 2/2017 | van Os |
| 9,659,577 | B1 | 5/2017 | Langhammer |
| 9,747,895 | B1 | 8/2017 | Jansche |
| 9,792,281 | B2 | 10/2017 | Sarikaya |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,886,953 | B2 | 2/2018 | Lemay |
| 9,986,394 | B1* | 5/2018 | Taylor ..................... H04W 4/18 |
| 9,990,591 | B2 | 6/2018 | Gelfenbeyn |
| 10,042,032 | B2 | 8/2018 | Scott |
| 10,134,395 | B2 | 11/2018 | Typrin |
| 10,199,051 | B2 | 2/2019 | Binder |
| 10,241,752 | B2 | 3/2019 | Lemay |
| 10,276,170 | B2 | 4/2019 | Gruber |
| 10,482,182 | B1* | 11/2019 | Jankowski, Jr. ........ G06K 9/344 |
| 10,762,903 | B1* | 9/2020 | Kahan ..................... G10L 15/26 |
| 2007/0124263 | A1* | 5/2007 | Katariya ............. G06F 16/3334 |
| | | | 706/14 |
| 2008/0240379 | A1 | 10/2008 | Maislos |
| 2012/0078889 | A1* | 3/2012 | Chu-Carroll .......... G06F 16/248 |
| | | | 707/723 |
| 2012/0078891 | A1* | 3/2012 | Brown ...................... F16H 3/54 |
| | | | 707/723 |
| 2012/0109858 | A1* | 5/2012 | Makadia ............... G06F 16/433 |
| | | | 706/12 |
| 2012/0246191 | A1 | 9/2012 | Xiong |
| 2012/0265528 | A1 | 10/2012 | Gruber |
| 2012/0294477 | A1* | 11/2012 | Yang ........................ G06K 9/38 |
| | | | 382/103 |
| 2013/0226892 | A1* | 8/2013 | Ehsani .................. G06F 16/951 |
| | | | 707/706 |
| 2013/0268839 | A1 | 10/2013 | Lefebvre |
| 2013/0275138 | A1 | 10/2013 | Gruber |
| 2013/0275164 | A1 | 10/2013 | Gruber |
| 2014/0164506 | A1 | 6/2014 | Tesch |
| 2014/0358890 | A1* | 12/2014 | Chen ..................... G06F 16/3329 |
| | | | 707/710 |
| 2015/0100524 | A1* | 4/2015 | Pantel ................. G06F 3/04842 |
| | | | 706/12 |
| 2015/0179168 | A1 | 6/2015 | Hakkani-Tur |
| 2015/0227519 | A1* | 8/2015 | Clark ....................... G06N 5/04 |
| | | | 706/11 |
| 2016/0117360 | A1* | 4/2016 | Kunc ................. G06F 16/24573 |
| | | | 707/730 |
| 2016/0170989 | A1* | 6/2016 | Bishop .................. G06F 16/243 |
| | | | 707/723 |
| 2016/0225370 | A1 | 8/2016 | Kannan |
| 2016/0255082 | A1 | 9/2016 | Rathod |
| 2016/0269472 | A1* | 9/2016 | Byron ................... G06F 16/345 |
| 2016/0328096 | A1 | 11/2016 | Tran |
| 2016/0378849 | A1 | 12/2016 | Myslinski |
| 2016/0378861 | A1 | 12/2016 | Eledath |
| 2017/0061956 | A1* | 3/2017 | Sarikaya ................. G06N 3/006 |
| 2017/0091168 | A1 | 3/2017 | Bellegarda |
| 2017/0132019 | A1 | 5/2017 | Karashchuk |
| 2017/0169013 | A1* | 6/2017 | Sarikaya ................ G06N 20/00 |
| 2017/0169354 | A1* | 6/2017 | Diamanti ................ G06F 16/00 |
| 2017/0344645 | A1* | 11/2017 | Appel ..................... H04W 4/38 |
| 2017/0353469 | A1 | 12/2017 | Selekman |
| 2017/0359707 | A1 | 12/2017 | Diaconu |
| 2018/0018562 | A1 | 1/2018 | Jung |
| 2018/0018987 | A1 | 1/2018 | Zass |
| 2018/0096071 | A1 | 4/2018 | Green |
| 2018/0096072 | A1 | 4/2018 | He |
| 2018/0107917 | A1 | 4/2018 | Hewavitharana |
| 2018/0115598 | A1* | 4/2018 | Shariat ...................... G06F 9/46 |
| 2018/0150739 | A1* | 5/2018 | Wu ..................... G06Q 10/1053 |
| 2018/0189628 | A1* | 7/2018 | Kaufmann ............. G06F 40/56 |
| 2018/0189629 | A1 | 7/2018 | Yatziv |
| 2018/0240014 | A1* | 8/2018 | Strope ..................... H04L 51/02 |
| 2018/0246953 | A1* | 8/2018 | Oh .......................... G06N 5/025 |
| 2018/0341871 | A1* | 11/2018 | Maitra ................. G06N 3/0427 |
| 2019/0080698 | A1 | 3/2019 | Miller |
| 2020/0184959 | A1* | 6/2020 | Yasa ..................... G06F 16/313 |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |

OTHER PUBLICATIONS

U.S. Appl. No. 14/593,723, filed Jan. 9, 2015, Colin Patrick Treseler.
U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.

(56) References Cited

OTHER PUBLICATIONS

U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, 2005, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, 2017, Apr. 3-7, 2017.
Chris Dyer, et al.: Recurrent Neural Network Grammars, Proceedings of NAACL-HLT 2016, pp. 199-209, San Diego, California, 2016, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/ Feb. 15, 2018.
What is Conversational AI? https://blog.salemove.com/what-is-conversational-ai/ Feb. 15, 2018.
Question Answering, http://en.wikipedia.org/wiki/Question_answering Feb. 15, 2018.
Dialog Manager, https://wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, 2016, Sep. 12, 2016.
Dubin, Ran, et al. "Adaptation Logic for HTTP Dynamic Adaptive Streaming using Geo-Predictive Crowdsourcing." arXiv preprint arXiv:1602.02030 (2016), Feb. 5, 2016.
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expressive/, May 19, 2016.
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.

* cited by examiner

GRAMMATICALITY CLASSIFICATION FOR NATURAL LANGUAGE GENERATION IN ASSISTANT SYSTEMS

PRIORITY

This application claims the benefit, under 35 U.S.C. § 119(e), of U.S. Provisional Patent Application No. 62/660,876, filed 20 Apr. 2018, and U.S. Provisional Patent Application No. 62/749,608, filed 23 Oct. 2018, which are incorporated herein by reference.

TECHNICAL FIELD

This disclosure generally relates to natural language generation within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may generate high-quality natural-language responses by using a filtering module to filter out ungrammatical responses. Neural approaches to Natural Language Generation (NLG) have been promising for goal-oriented dialogue. One of the challenges of productionizing these approaches, however, is the ability to control response quality, and ensure that generated responses are acceptable. Therefore, the assistant system may use a generate, filter, and rank framework, in which candidate responses are first filtered to eliminate unacceptable responses, and then ranked to select the best response. In particular embodiments, acceptability may include grammatical correctness and semantic correctness. The embodiments disclosed herein focus only on grammaticality classification and show that existing datasets for grammatical error correction do not correctly capture the distribution of errors that data-driven generators are likely to make. The embodiments disclosed herein also release a grammatical classification and semantic correctness classification dataset for the weather domain that consists of responses generated by 3 data-driven NLG systems. In particular embodiments, the assistant system may explore two supervised learning approaches (convolutional neural networks and gradient boosted decision tree) for classifying grammaticality. The experiments show that grammaticality classification may be very sensitive to the distribution of errors in the data, and that these distributions may vary significantly with both the source of the response as well as the domain. The embodiments disclosed herein show that it is possible to achieve high precision with reasonable recall on the released dataset. Although this disclosure describes generating particular responses via particular systems in particular manners, this disclosure contemplates generating any suitable response via any suitable system in any suitable manner.

In particular embodiments, the assistant system may receive, from a client system associated with a user, a user input. The assistant system may generate, by a natural-language generation module, a plurality of candidate responses in response to the user input. In particular embodiments, the assistant system may determine, by a filtering module, for each candidate response of the plurality of candidate responses, a quality-indication for the candidate response based on one or more classification models and one or more classification rules each corresponding to a respective acceptance-criteria. In particular embodiments, the assistant system may select one or more candidate responses from the plurality of candidate responses based on their respective quality-indications. The assistant system may then rank the selected candidate responses based on one or more ranking-criteria. In particular embodiments, the assistant system may further send, to the client system associated with the user responsive to receiving the user input, instructions for presenting a top-ranked candidate response to the user.

Certain technical challenges exist for achieving the goal of generating high-quality natural-language responses. One technical challenge may include effectively filtering out unacceptable candidate responses generated by the natural-language generation module of the assistant system. The solution presented by the embodiments disclosed herein to address the above challenge is using different types of classification models including grammaticality models, semantic-correctness models, and naturalness models since these classification models may automatically determine whether a response satisfies grammaticality, semantic correctness, and naturalness, based on which the assistant system may further determine if it is acceptable. Another technical challenge may include learning reliable classification models. The solution presented by the embodiments disclosed herein to address this challenge are collecting a large number of training samples comprising pre-generated responses and annotations of quality-indications and training the classification models based on these training samples using techniques including gradient boosted decision tree and convolutional neural networks, since the training samples may provide discriminative information to the classification models and gradient boosted decision tree and convolutional neural networks are robust machine-learning techniques that can effectively model the training samples.

Certain embodiments disclosed herein may provide one or more technical advantages. A technical advantage of the embodiments may include improving scalability to billions of users as the filter selects a reasonable amount of acceptable candidate responses with improved grammaticality and sematic correctness which are automatically generated by machine-learning algorithms. Another technical advantage of the embodiments may include improving computational efficiency for presenting responses to users as classification models are algorithms that can be executed efficiently and the efficiency of ranking may be improved as it would only be applied to a smaller size of candidate responses after the assistant system filters out a large number of unacceptable candidate responses. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
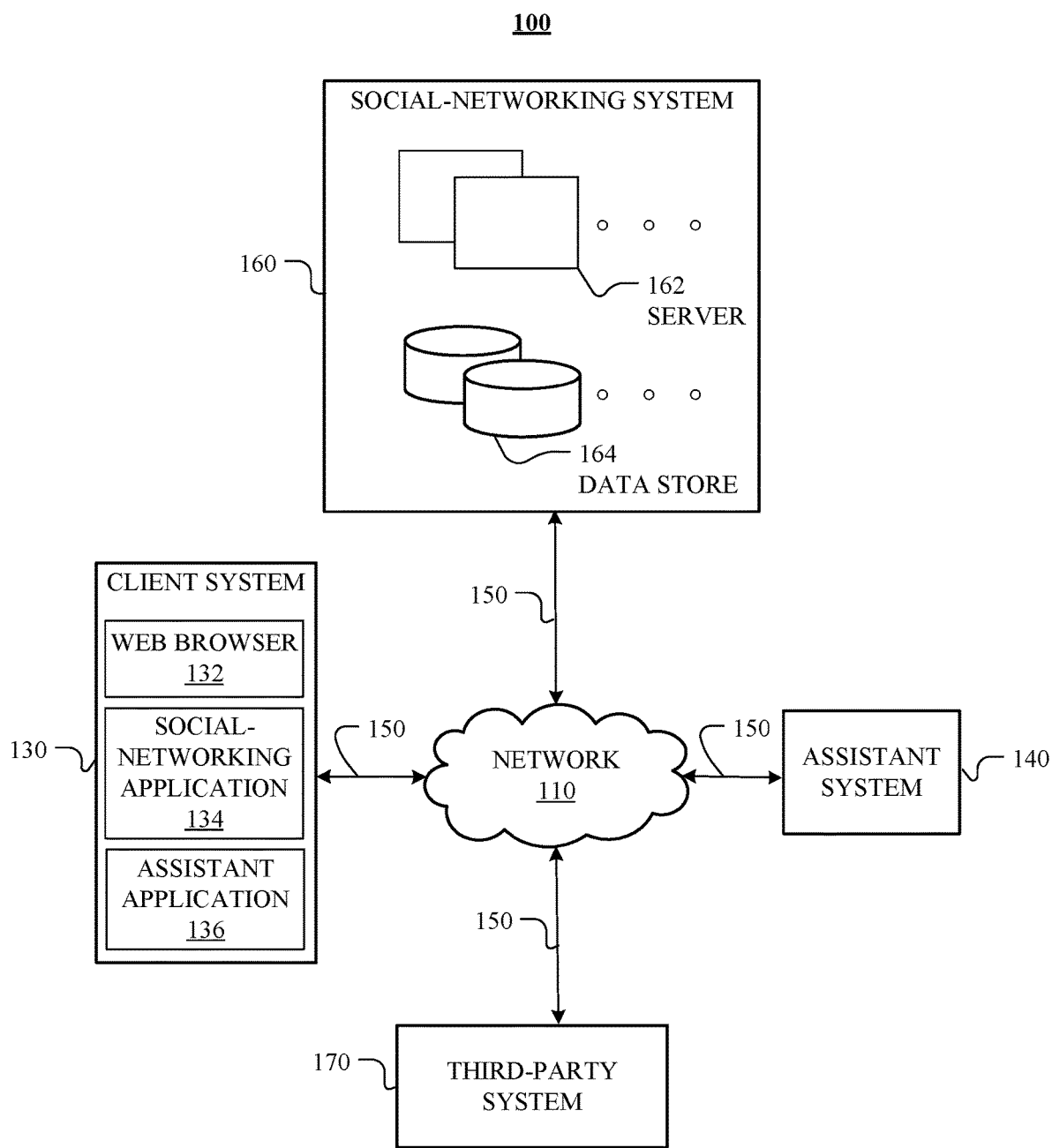
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. Design patent application No. 29/631910, filed 3 Jan. 2018, U.S. Design patent application No. 29/631747, filed 2 Jan. 2018, U.S. Design patent application No. 29/631913, filed 3 Jan. 2018, and U.S. Design patent application No. 29/631914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities.

As an example and not by way of limitation, the modalities may include audio, text, image, video, motion, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
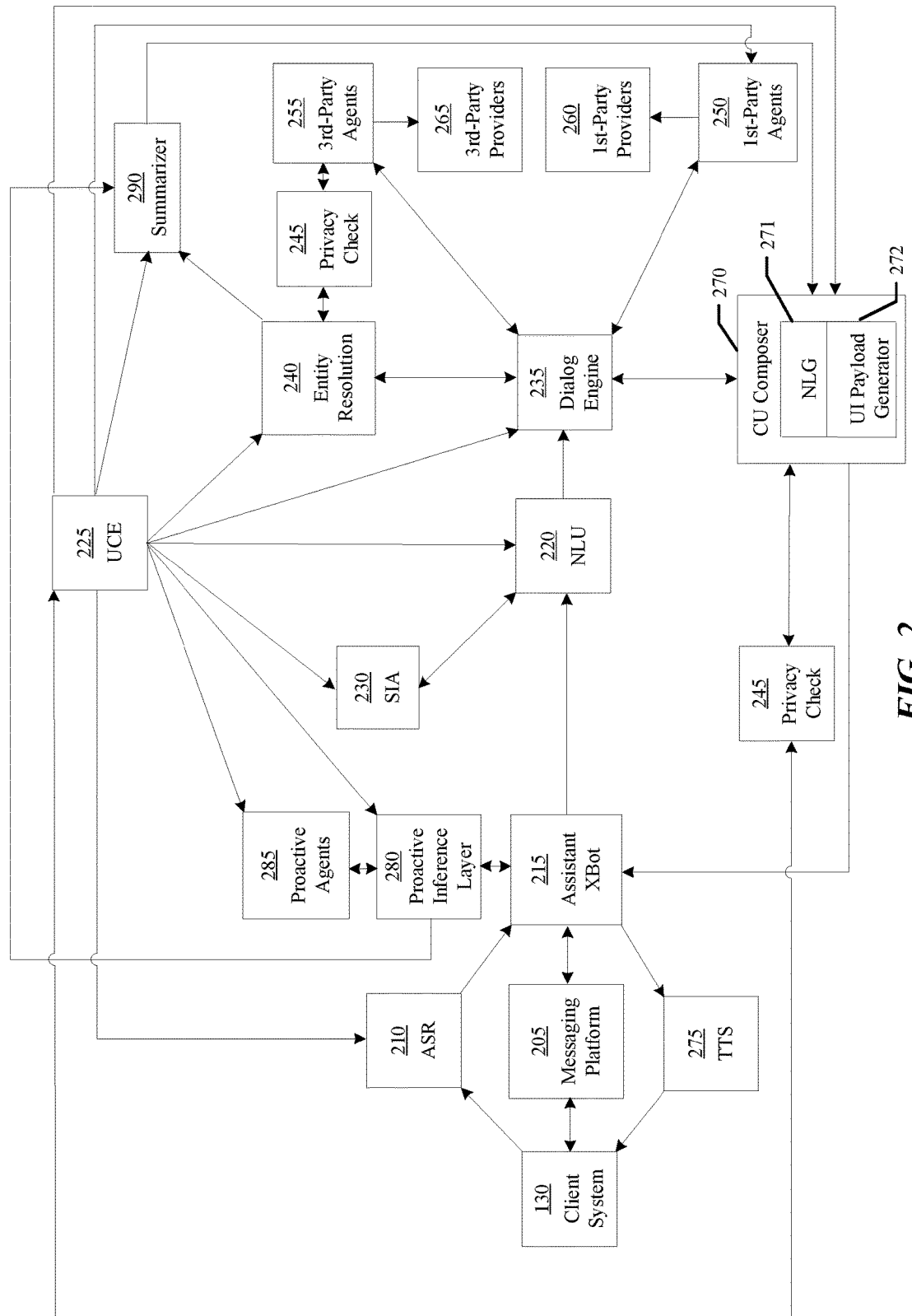
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of pre-defined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [IN:play_music]. In particular embodiments, a domain may be conceptually a namespace for a set of intents, e.g., music. A slot may be a named sub-string with the user input, representing a basic semantic entity. For example, a slot for "pizza" may be [SL:dish]. In particular embodiments, a set of valid or expected named slots may be conditioned on the classified intent. As an example and not by way of limitation, for [IN:play_music], a slot may be [SL:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie, which includes information that has been extracted from multiple content sources (e.g., movie review sources, media databases, and entertainment content sources), and then deduped, resolved, and fused to generate the single unique record for the knowledge graph. The entity may be associated with a space attribute value which indicates the genre of the movie. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
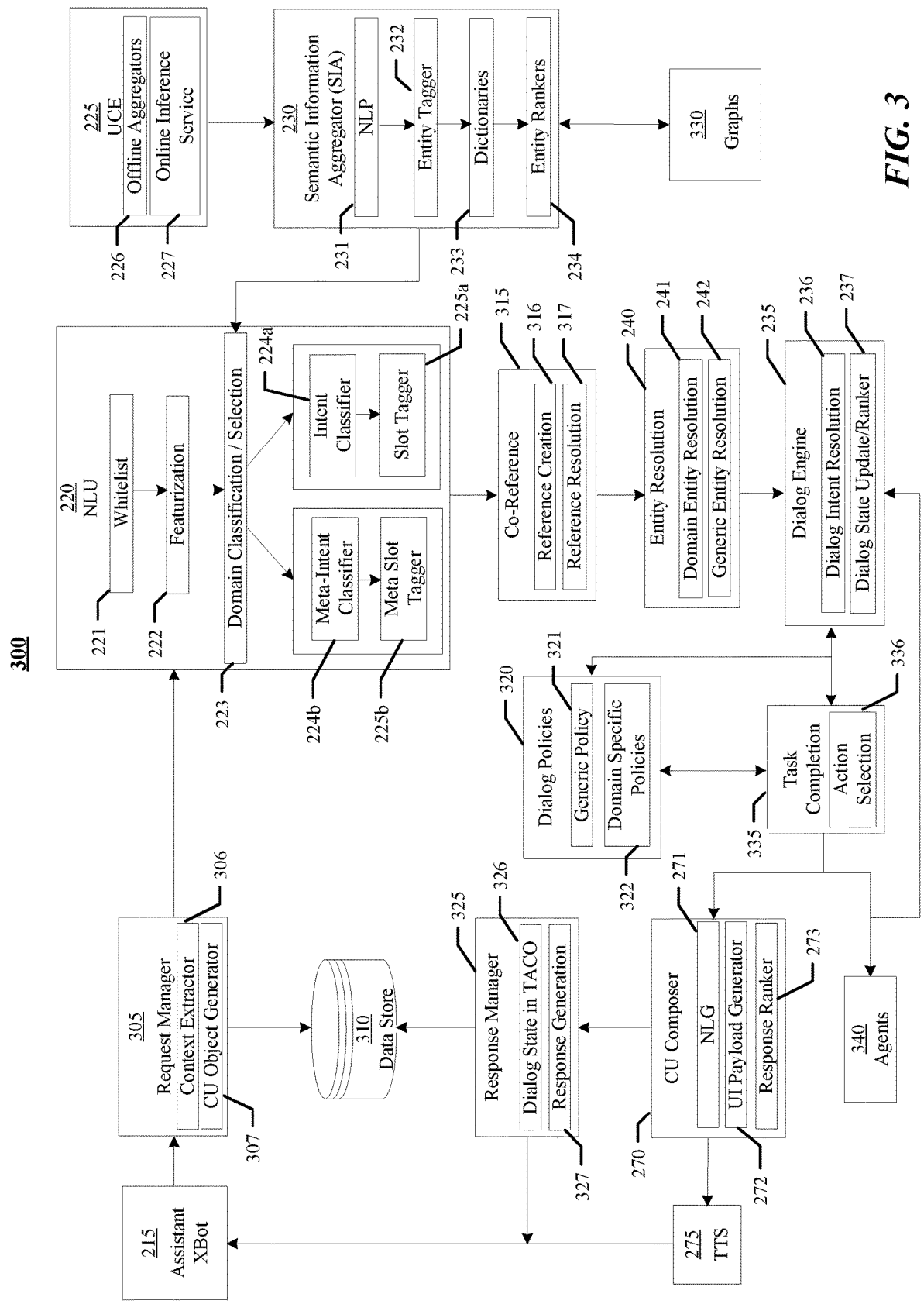
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise alarm is set on the client system 130. As another example and not by way of limitation, the update of contextual information may comprise a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. In particular embodiments, the slot tagger may annotate the one or more slots for the n-grams of the user request. At step 225b, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, actions with parameters, or rendered images or videos that can be displayed in a VR headset or AR smart glass. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Grammaticality Classification for Natural Language Generation in Assistant Systems In particular embodiments, the assistant system 140 may generate high-quality natural-language responses by using a filtering module to filter out ungrammatical responses. Neural approaches to Natural Language Generation (NLG) have been promising for goal-oriented dialogue. One of the challenges of productionizing these approaches, however, is the ability to control response quality, and ensure that generated responses are acceptable. Therefore, the assistant system 140 may use a generate, filter, and rank framework, in which candidate responses are first filtered to eliminate unacceptable responses, and then ranked to select the best response. In particular embodiments, acceptability may include grammatical correctness and semantic correctness. The embodiments disclosed herein focus only on grammaticality classification and show that existing datasets for grammatical error correction do not correctly capture the distribution of errors that data-driven generators are likely to make. The embodiments disclosed herein also release a grammatical classification and semantic correctness classification dataset for the weather domain that consists of responses generated by 3 data-driven NLG systems. In particular embodiments, the assistant system 140 may explore two supervised learning approaches (convolutional neural networks and gradient boosted decision tree) for classifying grammaticality. The experiments show that grammaticality classification may be very sensitive to the distribution of errors in the data, and that these distributions may vary significantly with both the source of the response as well as the domain. The embodiments disclosed herein show that it is possible to achieve high precision with reasonable recall on the released dataset. Although this disclosure describes generating particular responses via particular systems in particular manners, this disclosure contemplates generating any suitable response via any suitable system in any suitable manner.

In particular embodiments, the assistant system 140 may receive, from a client system 130 associated with a user, a user input. The assistant system 140 may generate, by a natural-language generation module, a plurality of candidate responses in response to the user input. In particular embodiments, the assistant system 140 may determine, by a filtering module, for each candidate response of the plurality of candidate responses, a quality-indication for the candidate response based on one or more classification models and one or more classification rules each corresponding to a respective acceptance-criteria. In particular embodiments, the assistant system 140 may select one or more candidate responses from the plurality of candidate responses based on their respective quality-indications. The assistant system 140 may then rank the selected candidate responses based on one or more ranking-criteria. In particular embodiments, the assistant system 140 may further send, to the client system 130 associated with the user responsive to receiving the user input, instructions for presenting a top-ranked candidate response to the user.

Introduction

In particular embodiments, one or more of the candidate responses may be generated by a language-template. The language-template may integrate one or more n-grams based on a particular order into a candidate response. In particular embodiments, one or more of the candidate responses may be generated by an information-retrieval algorithm. The information-retrieval algorithm may search a data store comprising a plurality of responses to identify the one or more of the candidate responses. In particular embodiments, one or more of the candidate responses may be generated by a machine-learning algorithm. The machine-learning algorithm may be based on a long-short term memory (LSTM) model. Although this disclosure describes generating particular responses in particular manners, this disclosure contemplates generating any suitable response in any suitable manner.

In recent years, neural network-based approaches have been increasingly promising in the context of goal-oriented Natural Language Generation (NLG). These approaches may effectively learn to generate responses of desired complexity and detail from unaligned data. Additionally, these approaches may be scaled with relatively low effort to new domains and use cases. However, they may be less robust to mistakes and have poor worst case performance. Consistently achieving acceptable response quality in a customer facing product may be an immediate blocker to using such models widely.

Controlling quality at generation time in these models is challenging, and there are no guarantees that any of the generated responses are suitable to surface to an end user. Additionally, quality is hard to enforce at data collection time, given the increasingly widespread dependence on large pools of untrained annotators. As a result, classifying acceptability with high precision is extremely desirable. It may be used to establish safe fallbacks to acceptable, but potentially less ideal, responses that are generated by more traditional NLG systems like templates. Such responses may be likely to be grammatically and semantically correct, but may sacrifice detail, variety, and naturalness; this trade-off may sometimes be necessary in a consumer-facing product. As an example and not by way of limitation, the system may respond with "Here's your weather forecast", and show a card with relevant weather information, rather than generate an incoherent weather forecast.

Some key aspects of acceptability may be grammaticality and semantic correctness. A grammatical response is one that is well-formed, and a semantically correct response is one that correctly expresses the information that needs to be conveyed. Systems that generate ungrammatical or incorrect responses may run the risk of seeming unreliable or unintelligent. Another important facet of acceptability may be the naturalness (or human likeness) of the response, that may improve the usability of chatbots and other dialogue systems. Correspondingly, the one or more classification models may comprise one or more of a grammaticality model, a semantic-correctness model, or a naturalness model. Using different types of classification models including grammaticality models, semantic-correctness models, and naturalness models may be an effective solution for addressing the technical challenge of effectively filtering out unacceptable candidate responses generated by the natural-language generation module of the assistant system 140, since these classification models may automatically determine whether a response satisfies grammaticality, semantic correctness, and naturalness, based on which the assistant system 140 may further determine if it is acceptable.

In particular embodiments, the assistant system 140 may include a filtering step that performs acceptability classification in the more widely used generate & rank framework (Generate, Filter, and Rank). The embodiments disclosed herein focus on grammaticality classification and show how this problem calls for datasets of a different nature than typical grammatical error correction (GEC) datasets. The embodiments disclosed herein also show that state-of-the-art GEC models trained on general corpora fail to generalize to this problem. Finally, the embodiments disclosed herein introduce a dataset of system-generated grammatical errors for the weather domain and demonstrate the performance of some strong baselines for grammatical classification on this data. This dataset may also be used for further research on semantic correctness classification. The experiments also reinforce the need for the new framework in the embodiments disclosed herein.

Generate, Filter, and Rank

In this section, the pros and cons of the traditional generate & rank framework are first reviewed, and then a "filter" step that addresses some of its downsides is disclosed.

The generate & rank framework has been proposed and widely used in several prior works on goal-oriented dialogue (Walker et al. (2001), Langkilde-Geary and Knight (1998)). In NLG systems, the typical use of this framework involves generating multiple candidate responses (often using various different surface realization techniques), and then reranking these using statistical models (most commonly language models). More recent works have also proposed reranking to optimize for certain personality traits or user engagement (Fang et al. (2017)). The input to the generators is usually a structured representation of what the system needs to convey.

This setup allows for the use of multiple generator models, as proposed in Serban et al. (2017) and Pichl et al. (2018), among others. This greatly increases the number of possible responses that can be surfaced, which can improve both diversity and naturalness. The use of statistical rerankers also allows systems under this framework to optimize for naturalness as well as acceptability (primarily grammaticality), since typical statistical models should easily be able to downrank potentially ungrammatical candidates. However, there are a few practical concerns that arise with using this framework in production:

1. Data sparsity: The space of unseen named entities like locations, datetimes, etc., and other sparse token types may be potentially very large. This may result in suboptimal language modeling behaviors, in which language models may downrank valid candidates with sparse surface forms.
2. Statistical models that are typically used for reranking may not capture semantic correctness without conditioning on the goal and arguments. They may also run the risk of accidentally biasing towards more likely (but semantically incorrect) responses. This may be particularly tricky for ML-based generators, where the generated responses may easily leave out important information. For example, the best models from Nayak et al. (2017) have error rates between 2-5%.
3. There may be a significant risk that none of the responses generated by data-driven models is acceptable. For example, in the dataset that we release in the embodiments disclosed herein, there were no grammatical responses generated for around 12% of the scenarios (see the Dataset section).

The common thread in these issues is that the generate & rank framework may conflate acceptability, which is objective, with naturalness and other traits, which are subjective. In particular embodiments, the assistant system 140 may add a high-precision "filter" step that eliminates any unacceptable candidate responses before the ranking stage to address it, allowing the re-ranker to focus on optimizing for naturalness and other desirable properties. As a result, the assistant system 140 may have a technical advantage of improving scalability to billions of users as the filter selects a reasonable amount of acceptable candidate responses with improved grammaticality and sematic correctness which are automatically generated by machine-learning algorithms. In particular embodiments, grammaticalness may be a more serious issue than semantic correctness in the dataset disclosed herein (Table 1). As a result, the assistant system 140 may use methods to implement a grammaticality "filter", which are disclosed in the following sections. In particular embodiments, each candidate response of the plurality of candidate responses may be associated with a confidence score. The assistant system 140 may then determine, by the one or more classification models, a threshold score for determining a quality-indication for a candidate response based on the plurality of confidence scores associated with the plurality of candidate responses. In particular embodiments, the assistant system 140 may perform ranking based on one or more ranking-criteria after processing the candidate responses with the "filter". In particular embodiments, the one or more ranking-criteria may be based on one or more of the confidence scores associated with the selected candidate responses or a consistence of the selected candidate responses with respect to the user input.

In particular embodiments, there may be an extreme case where the filtering module determines that all candidate responses are incorrect. Under such condition, the assistant system 140 may still have a fall back solution by presenting candidate responses generated by high-quality language-templates. These responses may be less expressive but they are at least correct. As an example and not by way of limitation, a user may ask the assistant system 140 "in how many days is John's birthday?" An ideal response generated by reliable machine-learning algorithms may be "John's birthday is in five days." However, the machine-learning algorithms, in reality, may not be able to generate such a response, which means all candidate responses generated by machine-learning algorithms may be incorrect. The filtering module may capture the mistakes of these candidate responses and filter out all of them. In this case, the assistant system 140 may present to the user a response generated by a language-template, e.g., "John's birthday is on Dec. 25, 2018." Although such a response is not consistent with the manner how the user asks the question, it is at least correct.

TABLE 1

Mistakes involving grammatical errors and other cases of unacceptability in model-generated weather responses.

| Error Category | Examples |
| --- | --- |
| Repeated words like "with", "and". | In Grand Prairie, it's 100 degrees Fahrenheit with cloudy skies with snow showers. |
| Agreement | Friday, September 15 in Branford, it'll be cloudy with a high of 73 degrees Fahrenheit with an 61 percent chance of snow showers. |
| Dangling modifiers | In Tongan Qu on Monday, May 22 will be scattered clouds with Patches of Fog, with a high of 18 degrees Celsius and a low of 7 degrees. |
| Incorrect word choice | In Lame on Thursday, November 23, it'll be scattered clouds with Fog, with a high of 46 and a low of 35 degrees Fahrenheit. |
| Ungrammatical n-grams | In Funabashi-shi on Monday, March 20, there will be a low of 31 with a high of 47 degrees Fahrenheit with scattered clouds skies and a Light Drizzle |
| Missing contextual words, like "degrees" | In Caloocan City, expect a temperature of 3 Celsius with mostly sunny skies and Fog Patches |

TABLE 1-continued

Mistakes involving grammatical errors and other cases of unacceptability in model-generated weather responses.

| Error Category | Examples |
| --- | --- |
| Linking words/ phrases | Right now in Arrondissement de Besancon, it's 2 degrees Fahrenheit with sunny and Light Fog |

In particular embodiments, the filtering module may be also based on one or more classification rules. The one or more classification rules may be based on one or more of metadata associated with the user input, a language-structure of the user input, user profile data associated with the user, or historical user input from the user and corresponding candidate responses presented to the user. As an example and not by way of limitation, metadata associated with the user input may comprise date and time. As another example and not by way of limitation, the filtering module may analyze the language-structure of the user input and select candidate responses with language-structures that match the language-structure of the user input. As another example and not by way of limitation, the user may have previously indicated dislikes for certain types of responses generated by the assistant system 140. As a result, the filtering module may filter out such types of candidate responses if they appear in the list of candidate responses again. In particular embodiments, the assistant system 140 may determine, by a natural-language understanding module 220, one or more slots and one or more intents associated with the user input. Correspondingly, the one or more classification rules may be based on the slots and intents. As an example and not by way of limitation, the classification rules for an intent of getting updates about a friend may be different from those for an intent of getting biographical introduction of a famous politician (e.g., favoring naturalness v.s. favoring grammaticality). In particular embodiments, the assistant system 140 may determine, based on contextual information associated with the user input, a modality for presenting the top-ranked candidate response to the user. Correspondingly, the one or more classification rules may be based on the determined modality. As an example and not by way of limitation, the assistant system 140 may check the user interface (UI) via which the user interacts with the assistant system 140. If the UI supports different modalities, the classification rules that the filtering module uses may be different for each modality. If a certain modality is determined for the output, the filtering module may further determine acceptance of candidate responses based on the suitability of the candidate responses for such determined modality.

The assistant system 140 may also have a technical advantage of improving computational efficiency for presenting responses to users as classification models are algorithms that can be executed efficiently and the efficiency of ranking may be improved as it would only be applied to a smaller size of candidate responses after the assistant system 140 filters out a large number of unacceptable candidate responses. In particular embodiments, the filtering module may work in an online fashion. In other words, a threshold number of candidate responses may be predetermined as the minimum candidate responses for executing the ranking. If the number of candidate responses does not reach the predetermined threshold number, the assistant system 140 may iteratively generate more candidate responses and filter them until the number of filtered candidate responses reaches the threshold number.

Mismatched Error Distributions

The CoNLL-2014 shared task on grammatical error correction (Ng et al. (2014)) released the NUCLE corpus for grammatical error correction (GEC), written by students learning English. Ungrammatical sentences in this dataset contain annotations and corrections of each individual error. From a classification perspective, each original ungrammatical utterance in the dataset is a negative example, and the final corrected utterance (obtained by applying all of the corrections to the original ungrammatical utterance) is a positive example. Additionally, sentences without any corrections are positive examples as well.

These positive and negative samples can then be directly used to train the grammaticality filter described in previous sections. In the runtime of the goal-oriented NLG system, this filter would be used to filter out ungrammatical responses that are generated by models—even though the filter was trained on human-written responses. This signals the possibility of a data mismatch.

To better understand the nature of this difference, a corpus of system-generated responses for the weather domain (see the Dataset section) are collected and 200 of these responses are manually inspected to identify common categories of model mistakes (see Table 2). Interestingly, it is found that the most common mistakes made by the models disclosed herein, like repeated words and missing contextual words, do not match any of the error categories in NUCLE (see Table 2 from Ng et al. (2014)). There are also qualitative differences stemming from the domains in these datasets. The corpus of weather responses disclosed herein has a large number of mentions of sparse entities (particularly locations), dates, and weather-specific constructs like temperatures, while the NUCLE corpus is open-ended and spans a variety of topics.

TABLE 2

Comparison of weather responses dataset against the NUCLE corpus.

|  | CoNLL-2014 | Our dataset |
| --- | --- | --- |
| # grammatical | 53426 | 18494 |
| # ungrammatical | 21638 | 14511 |
| % scenarios with no grammatical responses | N/A | 12% |
| Avg. length | 22.8 | 17.9 |
| Vocab size | 28180 | 5669 |
| # goals | N/A | 2 |
| # semantically correct | N/A | 28475 |
| # semantically incorrect | N/A | 4530 |

In order to quantify this difference, the performance of open-domain GEC models on the corpus of weather responses is measured by evaluating a model that achieves state-of-the-art performance on the CoNLL-2014 test set (Chollampatt and Ng, 2018). It is found that this model failed to generalize well to the weather dataset (see Experiments section) and missed several classes of errors. For example, the model failed to catch any of the errors in Table 2 (see Table 8 and Table 9 for more examples). Intuitively, this suggests that training models for response filtering demands datasets very different in distribution from publicly available datasets that only reflect human mistakes. The embodiments disclosed herein show this empirically through experiments in the Experiments section and describe the process for collecting the dataset in the next section.

Dataset

In particular embodiments, the assistant system 140 may train the one or more classification models based on a plurality of training samples. Each training sample may comprise a pre-generated response and a pre-annotated quality-indication associated with the pre-generated response. In the embodiments disclosed herein, a dataset of human-generated responses for the weather domain is first collected, using a process similar to the one used in Novikova et al. (2017). Each of the collected responses is conditioned on a scenario, consisting of a goal (the intent to be expressed) and arguments (information to be expressed). In collecting the dataset, the goals are restricted to the inform {current_condition} and {inform_forecast}.

An example scenario is
"requested_location": "London",
"temp": "32",
"temp_scale": "fahrenheit",
"precip_summary": "Heavy Blowing Snow"

A possible response for this scenario is "In London, it's currently 32 degrees Fahrenheit with heavy snow."

Some standard NLG models are then trained on this corpus. Two of these (sc-LSTM Lex and sc-LSTM Delex) are semantically conditioned LSTMs as described in Wen et al. (2015); the genLSTM model is a vanilla LSTM decoder; and IR is a simple retrieval-based generator. The details of these are described in section NLG Models for Generating Weather Responses. n=3 responses were generated from each of these models for each scenario in a held-out data set, and generated candidates that differed by a single character (often punctuation) were deduped. Crowdsource workers were then asked to judge the grammaticality of these responses. The final dataset consists of 33K model-generated responses with grammaticality and semantic correctness judgments. Table 3 shows a detailed breakdown of grammatical and ungrammatical responses per model.

chance of rain in New York on Wednesday, August 25" may become "There is an _num_vowel_ percent chance of rain in _location_on_date_". In case of sc-LSTM delex, all remaining arguments (such as weather conditions) are also delexicalized. To maintain class balance in the train set, for each response source, the class with fewer samples is up-sampled to match the number of samples of the other class. When training on samples from multiple generators, the samples of each generator in train set are up-sampled to match those of generator with highest number of samples.

TABLE 4

Features derived from Language Model.
Features from Language Model

| Geometric mean: $(\Pi mi = 1 pi)^{(\frac{1}{m})}$ | Arithmetic mean: $\Sigma\, m\, i = 1\, pi/m$ |
|---|---|
| min $P_x$ | max $P_x$ |
| Median: $\tilde{p}$ | Std Dev: $\sigma P_x$ |
| $C_{P_x}(0, 0.1), C_{P_x}(0.1, 0\ 2), \ldots C_{P_x}(0.9, 1.0)$ | |

Gradient Boosted Decision Tree Using LM Features (LM-GBDT) In particular embodiments, the one or more classification models may be based on gradient boosted decision tree. Language models (Brown et al. (1992)) can effectively capture n-gram patterns that occur in grammatical data, making features derived from them good candidates to distinguish between grammatical and ungrammatical responses. In particular embodiments, the assistant system 140 may train the one or more classification models based on a plurality of training samples. Training each of the one or more classification models may comprise the following steps. The assistant system 140 may first train, based on the plurality of training samples, an n-gram based language model. The assistant system 140 may then generate, by the n-gram based language model, a plurality of intermediate responses. The assistant system 140 may then extract, by the n-gram based language model, features of the plurality of intermediate responses. The assistant system 140 may further train, based on gradient boosted decision tree, the classification model by using the features of the plurality of intermediate responses. As an example and not by way of limitation, a 7-gram LM is trained on human-written weather responses described in Section Dataset. The trained

TABLE 3

Distribution of positive and negative examples in weather responses dataset.

| | Train | | Eval | | Test | |
|---|---|---|---|---|---|---|
| Generator | # grammaticals | # ungrammaticals | # grammaticals | # ungrammaticals | # grammaticals | # ungrammaticals |
| SC-LSTM Lex | 4957 | 2386 | 1565 | 882 | 1712 | 757 |
| SC-LSTM Delex | 1083 | 2078 | 365 | 679 | 377 | 657 |
| IR | 1530 | 2513 | 532 | 839 | 493 | 833 |
| Gen LSTM | 3614 | 1624 | 1133 | 600 | 1247 | 549 |

Approach

Preprocessing The assumption that the specific values of arguments such as locations, dates, and numbers do not affect sentence framing was made. Therefore, locations and dates are replaced with placeholder tokens. Numbers are replaced with either _num_, _num_vowel_ if the number begins with a vowel sound (e.g., 80), or _num_one_ if the number is 1. Hence the sentence "There is an 85 percent LM is then used to extract features listed in Table 4 for each model-generated response (aka. Intermediate response). In Table 4, $P_x = p_1, p_2, \ldots p_m$ is the set of all n-gram probabilities from an n-gram LM for a sentence x. $c_{P_x}(a, b) \in [0, 1]$ is the ratio of n-gram probabilities $pi \in Px$ for which $a \leq pi \leq b$. Finally, these features are fed into a gradient boosted decision tree (GBDT) (Friedman (2001)) to classify the model-generated response as grammatical or not.

Figure 4:
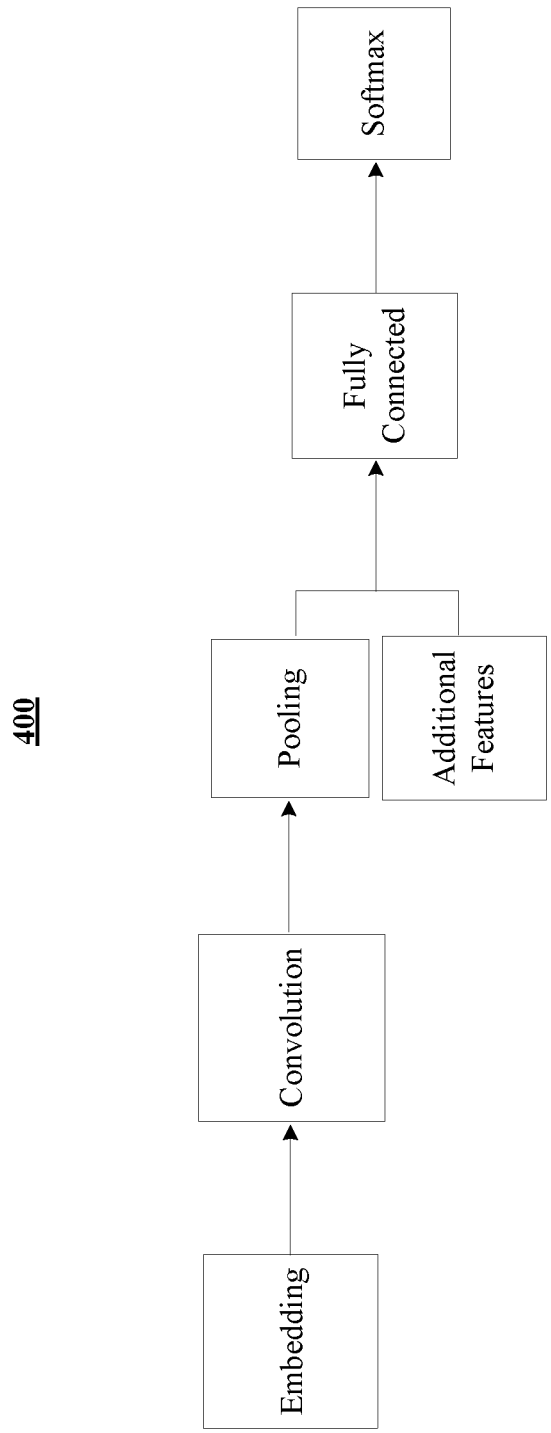
FIG. 4 illustrates an example diagram flow of a convolutional neural network based grammaticality classifier.

CNN-based Classification Model In particular embodiments, the one or more classification models may be based on one or more convolutional neural networks. As an example and not by way of limitation, a convolutional neural network (CNN) for sentence classification is used in an approach similar to Kim (2014). FIG. 4 illustrates an example diagram flow of a convolutional neural network based grammaticality classifier. After pooling convolutional features along the time dimension, the result may be optionally concatenated with additional features. A one-hot vector of length 4 encoding the source of the response (IR, GenL-STM, sc-LSTM delex, sc-LSTM lex) is passed as an additional feature when training on responses from multiple sources.

Collecting a large number of training samples comprising pre-generated responses and annotations of quality-indications and training the classification models based on these training samples using techniques including gradient boosted decision tree and convolutional neural networks may be effective solutions for addressing the technical challenge of learning reliable classification models, since the training samples may provide discriminative information to the classification models and gradient boosted decision tree and convolutional neural networks are robust machine-learning techniques that can effectively model the training samples.

Experiments

In particular embodiments, different combinations of NUCLE corpus and the weather dataset as disclosed in Section Dataset are used as train and test sets to learn a grammaticality classifier for model-generated weather responses. Table 6 and 7 list the results of these experiments described above. As discussed before, since the goal is to build a classifier for use in pro-duction systems, the recall of models for grammatical class when the precision is very high (98%) is reported. In cases where the model does not achieve this precision, recall at the highest precision achieved by the model is reported.

"CNN+source" represents the case when the source of response is passed as an additional feature to the CNN. Filters with widths 2, 3, 4, and 5 are used for the CNN. Performance did not change with different number and sizes of filters.

TABLE 5

Comparison of number of times the top ranked response is unacceptable with and without filtering.

| Experiment setting | Ungrammatical response picked | Semantically incorrect response picked |
| --- | --- | --- |
| Ranker | 29.4% | 8.2% |
| Filter + Ranker | 2.4% | 0.75% | i Ranker vs Filter + Ranker

In order to validate the Generate, Filter, and Rank framework, the trained n-gram language model (from Section Approach) is used to rank all the responses for each scenario in the weather dataset. The % of times the top ranked candidate is ungrammatical is then measured, to understand how many times the final response would be ungrammatical in a traditional generate & rank framework. The experiment is repeated with the framework in the embodiments disclosed herein, by filtering ungrammatical responses using a CNN-based filter with 98% precision before the ranking step. The results are shown in Table 5.

The filtering step increases the overall response quality but comes at the cost of losing genuine grammatical candidates because of slightly lower recall, 72.8%, (the best recall achieved on the weather dataset). This is a fundamental tradeoff of the framework in the embodiments disclosed herein. Recall is sacrificed for the sake of precision, in order to ensure that users of the system very rarely see an unacceptable response. The semantic correctness also improves, but this does not indicate that grammatical filter is enough to solve both grammaticalness and correctness problems.

ii Performance of Filters on NUCLE and Weather Data

Table 6 compares performance of CNN, LM-GBDT, and the GEC model used by Chollampatt and Ng (2018). The GEC model is adopted for binary classification by checking whether the model makes a correction for an ungrammatical sentence and does not make any corrections for a grammatical sentence. This model achieves poor precision and recall on the weather dataset, and it is found that it fails to generalize adequately to the novel error types in the data of the weather dataset.

TABLE 6

Training on NUCLE and weather data.

| Model | Training Data | Test Data | R @ P98 | R @ P |
| --- | --- | --- | --- | --- |
| Chollampatt and Ng (2018) | NUCLE | Weather | — | 75 @ 64 |
| CNN | NUCLE | NUCLE | 62.4 | — |
|  |  | Weather | — | 80 @ 56.8 |
|  | NUCLE + Weather | Weather | 52.5 | — |
| CNN | Weather | Weather | 71.9 | — |
| CNN + source | Weather | Weather | 72.8 | — |
| LM-GBDT | Weather | Weather | 63.8 | — |

In particular embodiments, the CNN is also trained on NUCLE data and it is found that it similarly achieves poor recall when classifying weather responses. This may be attributed to the fact that the domain and category of errors in both datasets are different. Comparing Table 1 in Ng et al. (2014) and Table 1 as presented above further supports this observation.

The CNN and LM-GBDT are trained and tested on the weather dataset. The performance of these models on the complete weather test set is reported, not just on individual generators, since this is closest to the setting in which such models would be used in a production system. The CNN consistently has better recall than LM-GBDT at the same precision. CNN+source performs better than the CNN, indicating that information regarding source may help in classifying responses from multiple generators. Augmenting the weather responses with NUCLE corpus while training the CNN did not help performance.

iii Performance of Filter for Individual Generators

TABLE 7

Performance of filter for individual generators.

| Model | Training Data | Test Data | R @ P98 | R @ P |
| --- | --- | --- | --- | --- |
| CNN + source | Weather | IR | 9.8 | — |
|  | IR | IR | 23.2 | — |
|  | Weather | GenLSTM | 95.5 | — |
|  | GenLSTM | GenLSTM | 92.2 | — |
|  | Weather | SC-LSTM Delex | 25.2 | — |
|  | SC-LSTM Delex | SC-LSTM Delex | — | 45.9 @ 80 |
|  | Weather | SC-LSTM Lex | 96.8 | — |

TABLE 7-continued

Performance of filter for individual generators.

| Model | Training Data | Test Data | R @ P98 | R @ P |
|---|---|---|---|---|
| | SC-LSTM Lex | SC-LSTM Lex | 94.6 | — |
| LM-GBDT | Weather | IR | — | 8 @ 95.5 |
| | IR | IR | 18 | — |
| | Weather | GenLSTM | 83.4 | — |
| | GenLSTM | GenLSTM | 76 | — |
| | Weather | SC-LSTM Delex | 2 | — |
| | SC-LSTM Delex | SC-LSTM Delex | — | 65.5 @ 70.5 |
| | Weather | SC-LSTM Lex | 90.6 | — |
| | SC-LSTM Lex | SC-LSTM Lex | 88.4 | — |

Table 7 presents results on test sets of each generator for classifiers trained together on all generators and trained on individual generators. Models trained individually on IR and SC-LSTM Delex responses perform poorly compared to GenLSTM and SC-LSTM Lex as the training set size is much smaller for former. The recall for individual generators is higher when training is done on data from all generators, indicating that the approach generalizes across sources. An exception to this is IR which does better when trained just on IR responses. This may be due to errors of retrieval-based approach being different in nature compared to LSTM-based approach.

Table 8 shows the errors in responses from different generators. Some errors occur more frequently with one generator than another, for example, the problem of repeating words (like with and and) is dominant in responses generated by the LSTMs, but very rarely seen in IR since it is a retrieval-based approach.

TABLE 8

Some more examples of grammatical errors made by different generation models in our dataset.

| Generator | Error Category | Examples |
|---|---|---|
| SC-LSTM Lex | Repeating words like "with", "and". | In Grand Prairie, it's 100 degrees Fahrenheit with cloudy skies with snow showers. |
| | Poor choice of words to connect 2 phrases | Right now in Medford, with a temperature of -10 degrees Celsius. |
| | Wrong Plurals/singulars | In Yushu, it's 1 degrees Celsius and cloudy. |
| | Missing words that forms incomplete sentences | In Tongan Qu on Monday, May 22 will be scattered clouds with Patches of Fog, with a high of 18 degrees Celsius and a low of 7 degrees.<br>* . . . May 22 there will be scattered clouds . . . *<br>Right now in East Liverpool it is -3 Fahrenheit with Heavy Rain.<br>*missing word degrees* |
| | Wrong articles | Friday, September 15 in Branford, it'll be cloudy with a high of 73 degrees Fahrenheit with an 61 percent chance of snow showers. |
| | Wrong pronouns | In Larne on Thursday, November 23, it'll be scattered clouds with Fog, with a high of 46 and a low of 35 degrees Fahrenheit.<br>*there'll be scattered clouds* |
| SC-LSTM Delex | Repeating words like "with", "and" | In Chengtangcun on Wednesday, April 12 expect a high of 2 degrees and a low of -10 degrees Celsius with cloudy skies with Snow Showers. |
| | Wrong word choices Wrong articles | In Funabashi-shi on Monday, March 20, there will be a low of 31 with a high of 47 degrees Fahrenheit with scattered clouds skies and a Light Drizzle<br>In Newbury on Tuesday, February 07, there will be an 46 percent chance of Heavy Rain Showers with a high of 5 degrees Celsius with overcast skies. |
| | Wrong Pluarals/Singulars | In Shiselweni District on Tuesday, March 21, it will be overcast with a high of 8 degrees Celsius and a low of 1 degrees. |
| | Missing contextual words like "degrees" | In Caloocan City, expect a temperature of 3 Celsius with mostly sunny skies and Fog Patches |
| Gen LSTM | Repeating words like "with", "and" | Right now in Wojewodztwo Maopolskie, it's sunny with Light Thunderstorms with Hail and a temperature of 13 degrees Fahrenheit. |
| | Poor word choices | Right now in Franklin Square, it's 96 degrees Fahrenheit with scattered clouds skies. |
| | Wrong articles | On Friday, November 17 in San-Pedro, expect a low of 44 and a high of 68 degrees Fahrenheit with an 41 percent chance of Flurries. |
| | Wrong Plurals/Singulars | Right now in Minnetonka Mills, it's 1 degrees Celsius with sunny skies. |
| | Wrong pronouns | On Monday, July 03 in Himeji Shi, it'll be scattered clouds with a high of 48 degrees Fahrenheit.<br>*there'll be scattered clouds* |

TABLE 8-continued

Some more examples of grammatical errors made by different generation models in our dataset.

| Generator | Error Category | Examples |
|---|---|---|
| | Wrong connecting words | Right now in Arrondissement de Besancon, it's 2 degrees Fahrenheit with sunny and Light Fog <br> * . . . and sunny with light fog . . . would make it grammatical* |
| IR | Wrong articles | In Shiraki Marz on Thursday, November 09, there will be an 51 percent chance of Heavy Blowing Snow and a high of 39 degrees Fahrenheit |
| | Wrong ordinal indicators | On Friday, June 02th in Selma there will be a low of 82 degrees Fahrenheit with Light Thunderstorms with Hail |
| | Wrong Plurals/Singulars | On Tuesday, June 13, in Wilayat-e Paktiya, there will be Heavy Snow Showers and the high will be 1 degrees Celsius. |
| | Wrong helping verbs (Plural versus singular) | N/A |
| | Wrong Pronoun | On Wednesday, October 18, in Reus, it'll be scattered clouds and 3 degrees Celsius. * . . . there'll be scattered clouds . . . * |
| | Poor templates like one with repeating words, spelling mistakes, missing words like degrees | In Rudraprayag on Tuesday, November Tuesday, June 13 temp is −8 to 0 Celsius with Low Drifting Snow Snow Showers and overcast cloud |
| | Out of vocabulary words | It's currently −15 degrees Fahrenheit t and mostly clear with gentle breeze in Dammam | iv Comparison of LM-GBDT and CNN

The recall of CNN is slightly better than LM-GBDT consistently across experiments. Both approaches do well in catching types of errors listed in Table 1. One difference between the two is the ability of CNN-based models to successfully catch errors such as "1 degrees", while the LM-GBDT fails to do so. On further inspection, it is noticed that the human generated weather responses, which were used as training data for the language model, contained several instances of "1 degrees". The LM-GBDT has a heavy dependency on the quality of features generated by LM (which in turn depends on the quality of the LM training corpus), and this is a disadvantage compared to the CNNs.

Related Work & Conclusion

Several previous works have established the need for a generate & rank framework in a goal-oriented NLG system (Walker et al. (2001), Langkilde-Geary and Knight (1998)). Recent work on the Alexa prize (Ram et al. (2018)) has demonstrated that this architecture is beneficial for systems that bridge the gap between task-oriented and open-ended dialogue (Serban et al. (2017), Fang et al. (2017), Pichl et al. (2018)). In such systems, the ranker needs to choose between a much more diverse set of candidates, and potentially optimize for other objectives like personality or user satisfaction. To make such systems practical for production-scale usage, the embodiments disclosed herein include a high precision filter step that precedes ranking and may mark responses as acceptable. The experiments show that this filter with sufficient fallbacks guarantees response quality with high precision, while simply reranking does not (Section Ranker vs Filter+Ranker).

The embodiment disclosed herein focus specifically on filtering ungrammatical responses. Previous work in this space has focused on classifying (and sometimes correcting) errors made by humans (Ng et al. (2014)) or synthetically induced errors (Foster (2007)). It is found, however, that the domain and error distribution in such datasets is significantly different from that of typical data-driven generation techniques. To address this gap, the embodiments disclosed herein release grammatical and semantic correctness classification data generated by these models and present a reasonable baseline for grammatical classification. The approaches in the embodiments disclosed herein are similar to work on grammatical classification using features from generative models of language, like language models (Wagner et al. (2009)). One future direction may be to explore modeling semantic correctness classification with the dataset in the embodiments disclosed herein.

The embodiments disclosed herein compare the performance of two approaches for classifying grammaticality: CNNs and GB-DTs with language model features. Both are standard classifiers that are easy to deploy in production systems with low latency. An interesting future direction may be to explore model architectures that scale better to new domains and generation approaches. This may include models that take advantage of existing GEC data consisting of human responses, as well as datasets similar to the weather datasets as disclosed herein for other domains. Models that successfully make use of these datasets may have a more holistic understanding of grammar and thus be domain- and generator-agnostic.

A drawback of the generate-filter-rank framework may be the increased reliance on a fallback response in case no candidate clears the filtering stage. This may be an acceptable trade-off when the goal is to serve responses in production systems where the standards of acceptability are high. One way to alleviate this may be to do grammatical error correction instead of simply removing unacceptable candidates from the pipeline. Correcting errors instead of rejecting candidates may be of value for trivial mistakes such as missing articles or punctuation. However, doing this with high precision and correcting semantic errors remains a challenge.

NLG Models for Generating Weather Responses

The dataset in the embodiments disclosed herein comprises responses generated by 4 model types:

1. sc-LSTM delex: An sc-LSTM trained on fully delexicalized human responses, where delexicalization refers to the process of replacing spans corresponding to specific arguments by placeholder strings.
2. sc-LSTM lex: An sc-LSTM trained on partly delexicalized human responses. For this model, only locations, dates, and temperatures are delexicalized, thus allowing the model to freely choose surface forms for any other arguments.
3. GenLSTM: A vanilla LSTM-based decoder model, where the decoder hidden state is initialized using embeddings of the goal and arguments. This model is also trained on fully delexicalized responses.
4. IR: A simple retrieval approach in which n random candidates that satisfy the given goal and arguments are retrieved. The retrieved candidates are delexicalized, and any candidates that contain the right arguments (regardless of argument value) are considered valid.

For all models, the final response is obtained by replacing argument placeholders by the canonical values of those arguments in the scenario. Since the goal was just to get responses from a diverse set of data-driven generators with a reasonable distribution of errors, the embodiments disclosed herein did not experiment too much with improving IR and genLSTM, which are much weaker than the sc-LSTM models.

Model-Generated Responses: Error Analysis

As previously presented, Table 8 shows errors made by different generators. While there is an overlap in the category of grammatical errors made by different generators, the frequency of the errors is largely different. There are also a few generator-specific errors. As an example and not by way of limitation, the problem of repeating words (like with and and) is dominant in responses generated by GenLSTM, sc-LSTM delex, sc-LSTM lex, but very rarely seen in IR. This may be because human responses themselves are unlikely to have repeating words, however the LSTM-based generators tend to make these mistakes while trying to fit all information into the response. Ungrammatical n-grams like scattered clouds skies are very infrequent in sc-LSTM lex responses while more commonly seen with other generators. This may be because the sc-LSTM lex generator directly produces surface forms of weather conditions. LSTM models do not tend to generate responses with out-of-vocabulary words, but it is something common with IR responses usually because of spelling mistakes in templates.

General GEC Model Performance

Table 9 shows examples of ungrammatical responses that the general GEC model ((Chollam-patt and Ng, 2018)) failed to correct. Table 10 shows examples of ungrammatical responses that the model correctly edited. The model corrects mistakes that are much more likely to occur in the GEC data (like verb agreement) but fails to catch model-specific error types like stuttering and other ungrammatical n-grams.

TABLE 9

Mistakes involving grammatical errors and other cases of unacceptability in model-generated weather responses.

| Response | Error type |
| --- | --- |
| On Friday, February 17 in Changwat Samut Songkhram, expect a likely of heavy rain showers and a high of 15 degrees Celsius. | Agreement |

TABLE 9-continued

Mistakes involving grammatical errors and other cases of unacceptability in model-generated weather responses.

| Response | Error type |
| --- | --- |
| Currently in Maastricht there is fog and is −3 Fahrenheit. | Missing "degrees" |
| Right now in Westminster it is 1 degrees Fahrenheit with partly cloudy skies. | Numerical agreement |
| In Ayacucho on Wednesday, February 22, with a high of 83 degrees Fahrenheit with a 98 percent chance of light snow. | Repeated "with", and missing linking words |
| In kajiado on Thursday, January 12, expect a high of 82 degrees and a low of 61 degrees Fahrenheit with mostly sunny. | Incomplete response |

TABLE 10

Mistakes involving grammatical errors and other cases of unacceptability in model-generated weather responses.

| Original Response | Corrected Response |
| --- | --- |
| The weather for Wednesday, December 27 in Oak Hill will includes a high of 14 Celsius and a 37 per- cent chance of heavy freezing rain. | The weather for Wednesday, December 27 in Oak Hill will include a high of 14 Celsius and a 37 percent chance of heavy freezing rain. |
| In Ocean County, it is 34 degrees Fahrenheit with sunny. | In Ocean County, it is 34 degrees Fahrenheit with sunny weather. |
| In Bim Son, it is 1 degrees Fahrenheit with funnel cloud, | In Bim Son, it is 1 degrees Fahrenheit with funnel clouds. |

REFERENCES

The following list of references correspond to the citations above:

Peter F Brown, Peter V Desouza, Robert L Mercer, Vincent J Della Pietra, and Jenifer C Lai. 1992. Class-based n-gram models of natural language. *Computational linguistics*, 18(4):467-479.

Shamil Chollampatt and Hwee Tou Ng. 2018. A multilayer convolutional encoder-decoder neural network for grammatical error correction. In *Proceedings of the Thirty-Second AAAI Conference on Artificial Intelligence*.

Hao Fang, Hao Cheng, Elizabeth Clark, Ariel Holtzman, Maarten Sap, Mari Ostendorf, Yejin Choi, and Noah A Smith. 2017. Sounding board—university of washingtons alexa prize submission. *Alexa Prize Proceedings*.

Jennifer Foster. 2007. Treebanks gone bad. International Journal of Document Analysis and Recognition (IJDAR), 10(3-4):129-145.

Jerome H Friedman. 2001. Greedy function approximation: a gradient boosting machine. *Annals of statistics*, pages 1189-1232.

Yoon Kim. 2014. Convolutional neural networks for sentence classification. In *Proceedings of the 2014 Conference on Empirical Methods in Natural Language Processing*, pages 1746-1751.

Irene Langkilde-Geary and Kevin Knight. 1998. Generation that exploits corpus-based statistical knowledge. In *COLING-ACL*.

Neha Nayak, Dilek Hakkani-Tur, Marilyn Walker, and Larry Heck. 2017. To plan or not to plan? discourse planning in slot-value informed sequence to sequence models for language generation. In *INTERSPEECH*.

Hwee Tou Ng, Siew Mei Wu, Ted Briscoe, Christian Hadiwinoto, Raymond Hendy Susanto, and Christopher Bryant. 2014. The conll-2014 shared task on grammatical error correction. In *Proceedings of the Eighteenth Conference on Computational Natural Language Learning: Shared Task*.

Jekaterina Novikova, Ondej Due, and Verena Rieser. 2017. The e2e dataset: New challenges for end-to-end generation. In *Proceedings of the SIGDIAL 2017 Conference*, pages 201-206.

Jan Pichl, Petr Marek, Jakub Konrád, Martin Matulíḱ, Hoang Long Nguyen, and Jan Sedivy´. 2018. *Alquist: The alexa prize socialbot. CoRR*, abs/1804.06705.

Ashwin Ram, Rohit Prasad, Chandra Khatri, Anu Venkatesh, Raefer Gabriel, Qing Liu, Jeff Nunn, Behnam Hedayatnia, Ming Cheng, Ashish Nagar, et al. 2018. Conversational ai: The science behind the alexa prize. *arXiv preprint arXiv:1801.03604*.

Iulian Vlad Serban, Chinnadhurai Sankar, Mathieu Germain, Saizheng Zhang, Zhouhan Lin, Sandeep Subramanian, Taesup Kim, Michael Pieper, Sarath Chandar, Nan Rosemary Ke, Sai Mudumba, Alexandre de Brébisson, Jose Sotelo, Dendi Suhubdy, Vincent Michalski, Alexandre Nguyen, Joelle Pineau, and Yoshua Bengio. 2017. *A deep reinforcement learning chatbot. CoRR*, abs/1709.02349.

Joachim Wagner, Jennifer Foster, and Josef van Genabith. 2009. Judging grammaticality: Experiments in sentence classification. In *CALICO Journal*, pages 474-490.

Marilyn A. Walker, Owen Rambow, and Monica Rogati. 2001. Spot: A trainable sentence planner. In *NAACL*.

Tsung-Hsien Wen, Milica Gasic, Nikola Mrksic, Pei-Hao Su, David Vandyke, and Steve Young. 2015. Semantically conditioned lstm-based natural language generation for spoken dialogue systems. In *EMNLP*.

Figure 5A:
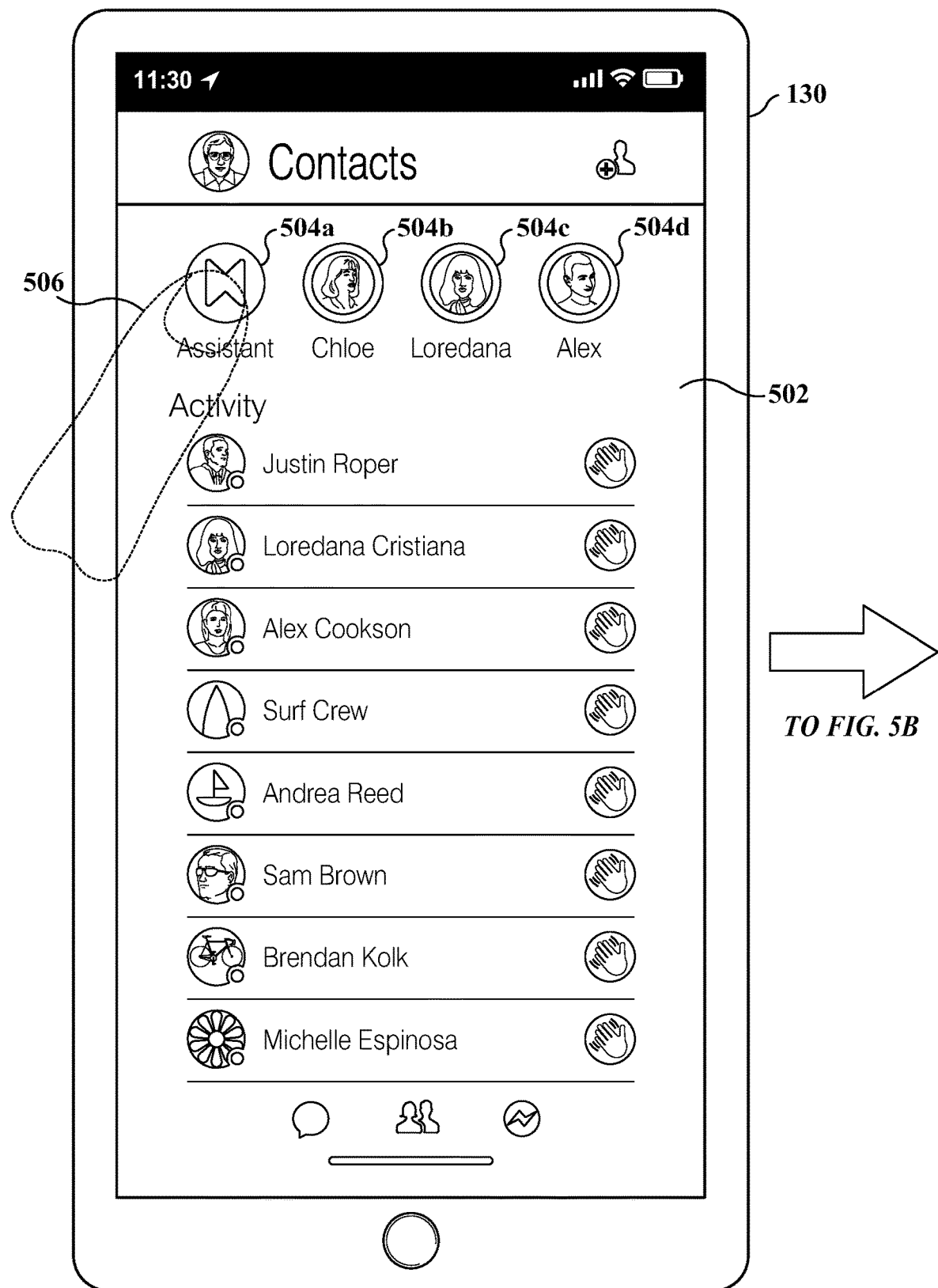
FIG. 5A illustrates an example context where a user may interact with the assistant system via a messaging application.
Figure 5B:
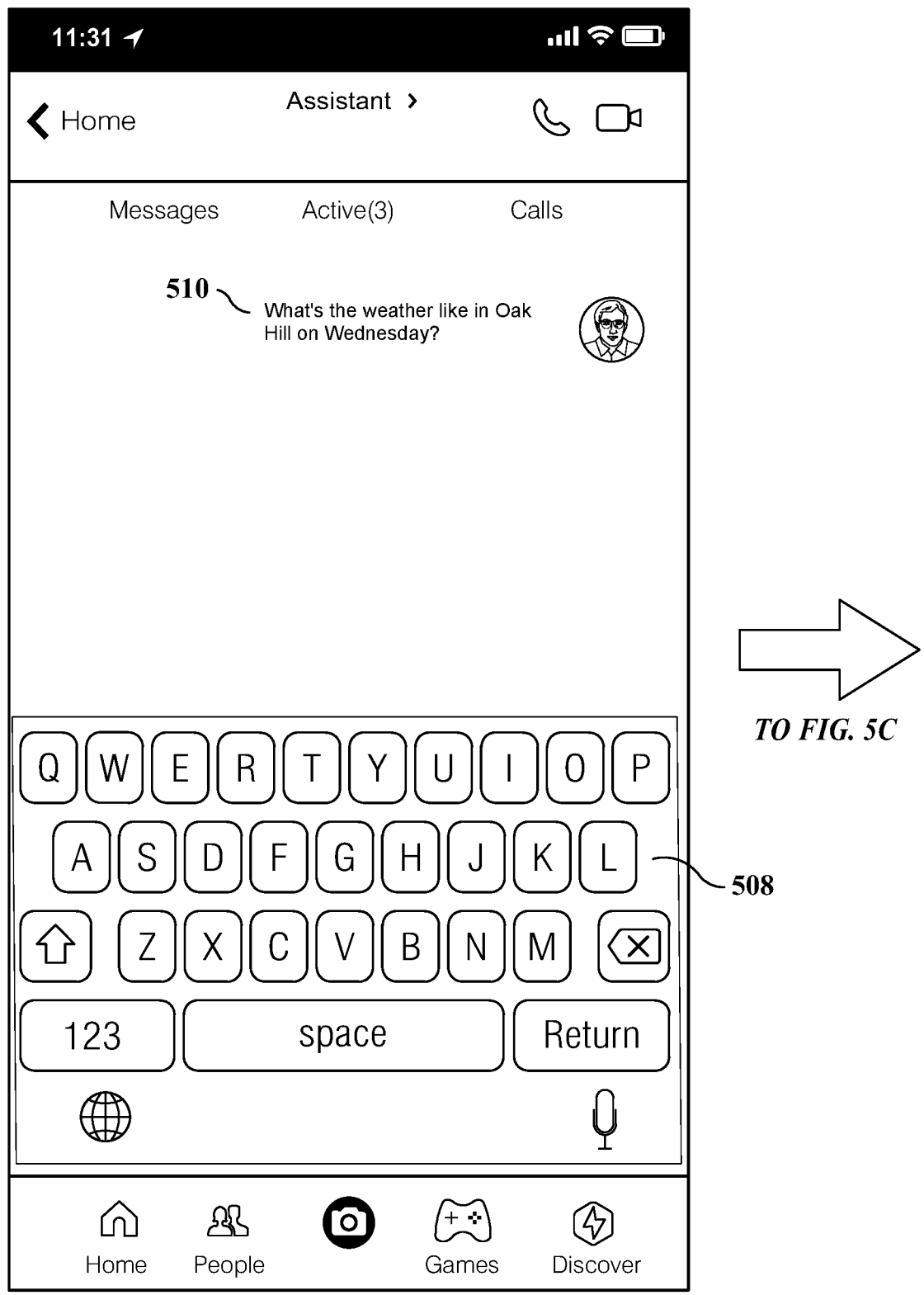
FIG. 5B illustrates an example conversation thread where the user may interact with the assistant xbot for assistance request from the assistant system.
Figure 5C:
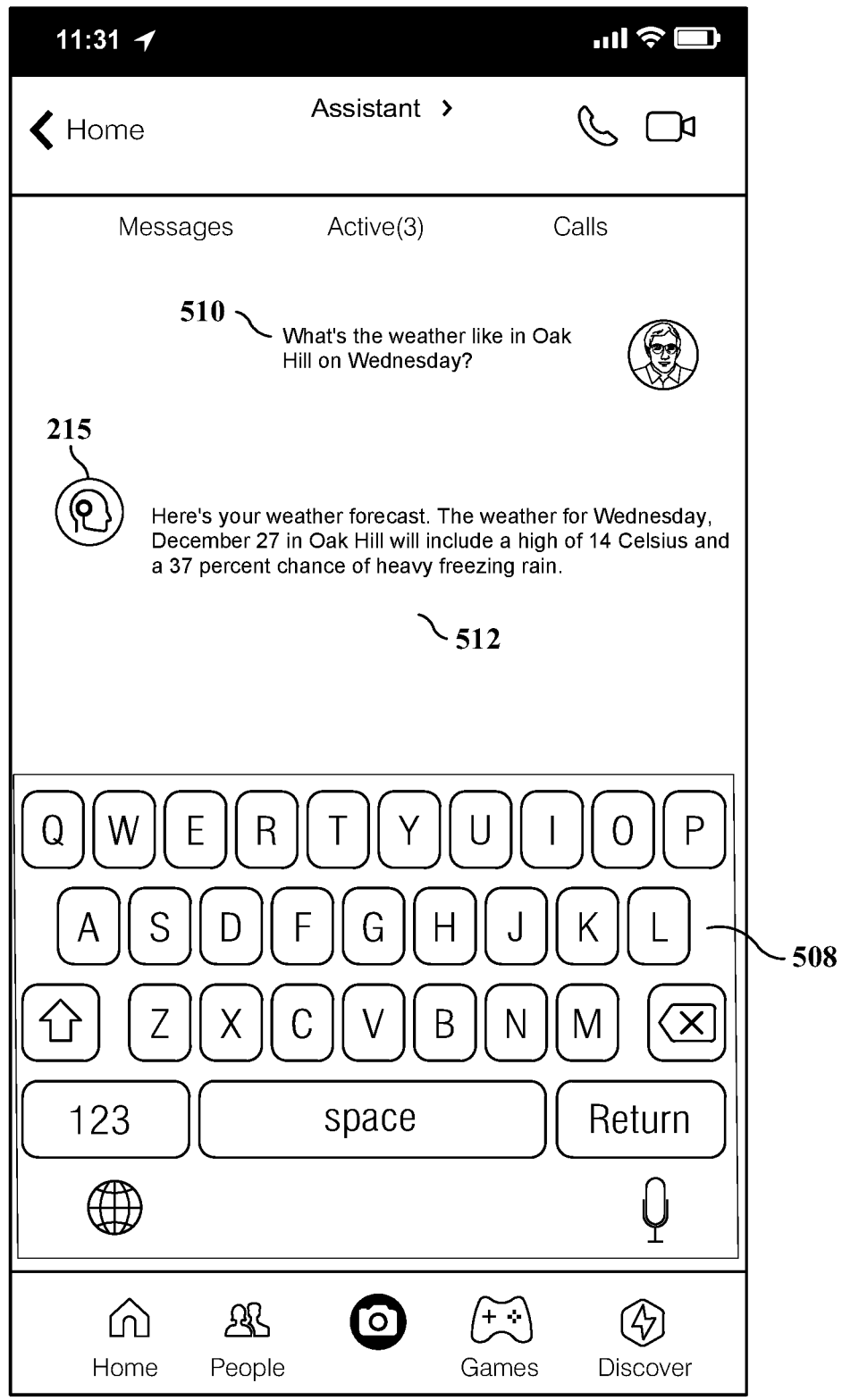
FIG. 5C illustrates an example high-quality natural-language response generated by the assistant system regarding the user's assistance request.

FIGS. 5A-5C illustrate example user interfaces associated with a high-quality natural-language response generated by the assistant system 140. FIG. 5A illustrates an example context 502 where a user may interact with the assistant system 140 via a messaging application. The context 502 may be displayed on a client system 130 associated with the user. In particular embodiments, the context 502 may comprise a plurality of icons 504*a*-504*d* that the user may select to start a conversation thread with the user's contacts. As an example and not by way of limitation, the icons 504*a*-504*d* may correspond to the assistant xbot 215, Chloe, Loredana, and Alex, respectively. In particular embodiments, the user may select the icon 504*a* to start a conversation thread with the assistant xbot 215 via a touch element 506. As an example and not by way of limitation, the touch element 506 may be a finger of the user. In particular embodiments, the user may interact with the assistant xbot 215 within the conversation thread to request assistance from the assistant system 140. FIG. 5B illustrates an example conversation thread where the user may interact with the assistant xbot 215 for assistance request from the assistant system 140. As an example and not by way of limitation, the user may ask the assistant xbot 215 a question 510 "What's the weather like this week in Oak Hill on Wednesday?" via a keypad 508. FIG. 5C illustrates an example high-quality natural-language response generated by the assistant system 140 regarding the user's assistance request. As an example and not by way of limitation, after receiving the user's question 510 "What's the weather like this week in Oak Hill on Wednesday?" the assistant xbot 215 may respond with an answer 512 "Here's your weather forecast. The weather for Wednesday, December 27 in Oak Hill will include a high of 14. Celsius and a 37 percent chance of heavy freezing rain." Although this disclosure describes particular user interfaces associated with particular responses in particular manners, this disclosure contemplates any suitable user face associated with any suitable response in any suitable manner.

Figure 6:
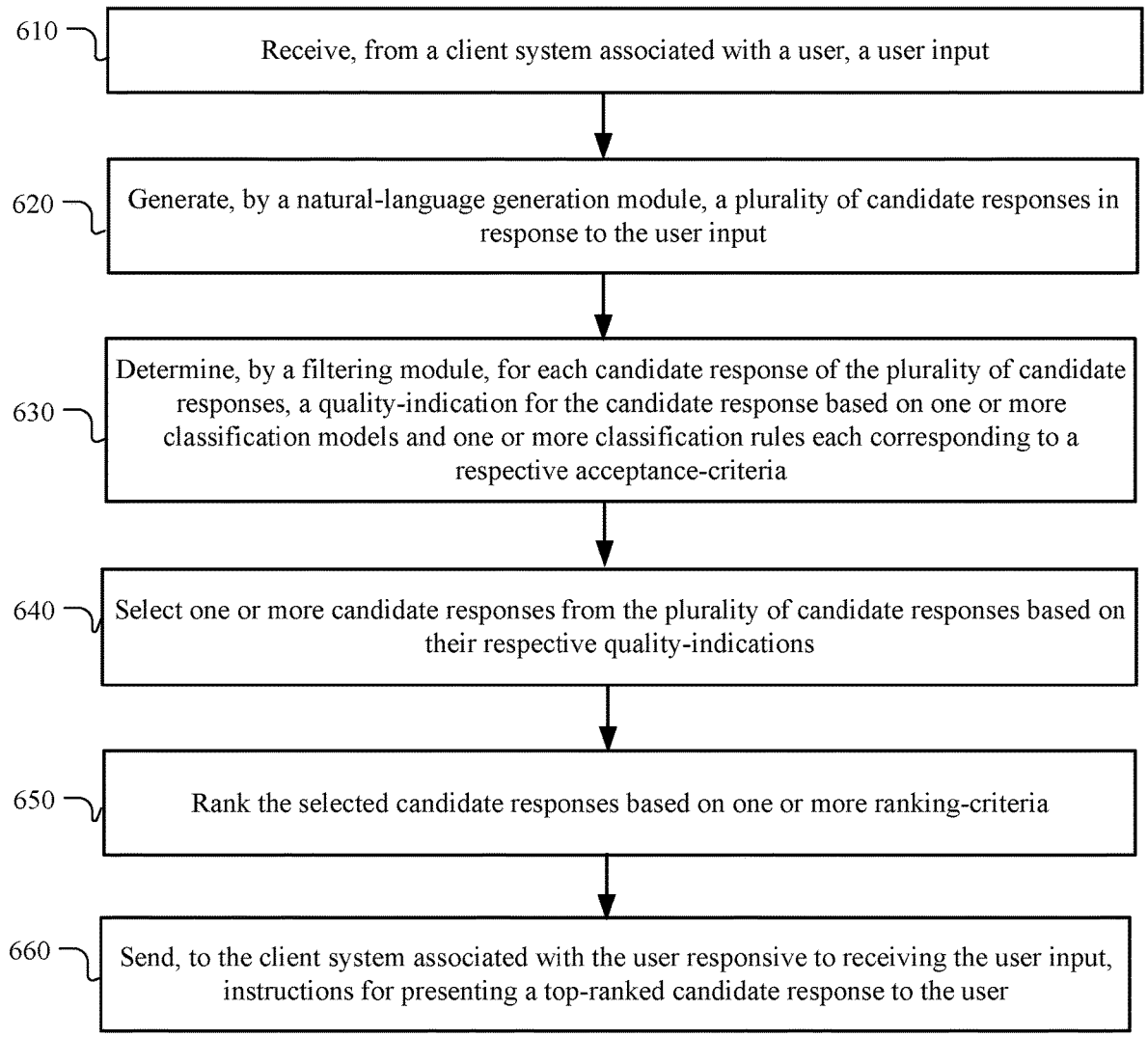
FIG. 6 illustrates an example method for generating high-quality natural-language responses.

FIG. 6 illustrates an example method 600 for generating high-quality natural-language responses. The method may begin at step 610, where the assistant system 140 may receive, from a client system 130 associated with a user, a user input. At step 620, the assistant system 140 may generate, by a natural-language generation module, a plurality of candidate responses in response to the user input. At step 630, the assistant system 140 may determine, by a filtering module, for each candidate response of the plurality of candidate responses, a quality-indication for the candidate response based on one or more classification models and one or more classification rules, wherein the classification models and classification rules are based on one or more acceptance-criteria. At step 640, the assistant system 140 may select one or more candidate responses from the plurality of candidate responses based on their respective quality-indications. At step 650, the assistant system 140 may rank the selected candidate responses based on one or more ranking-criteria. At step 660, the assistant system 140 may send, to the client system 130 associated with the user responsive to receiving the user input, instructions for presenting a top-ranked candidate response to the user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating high-quality natural-language responses including the particular steps of the method of FIG. 6, this disclosure contemplates any suitable method for generating high-quality natural-language responses including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graphs

Figure 7:
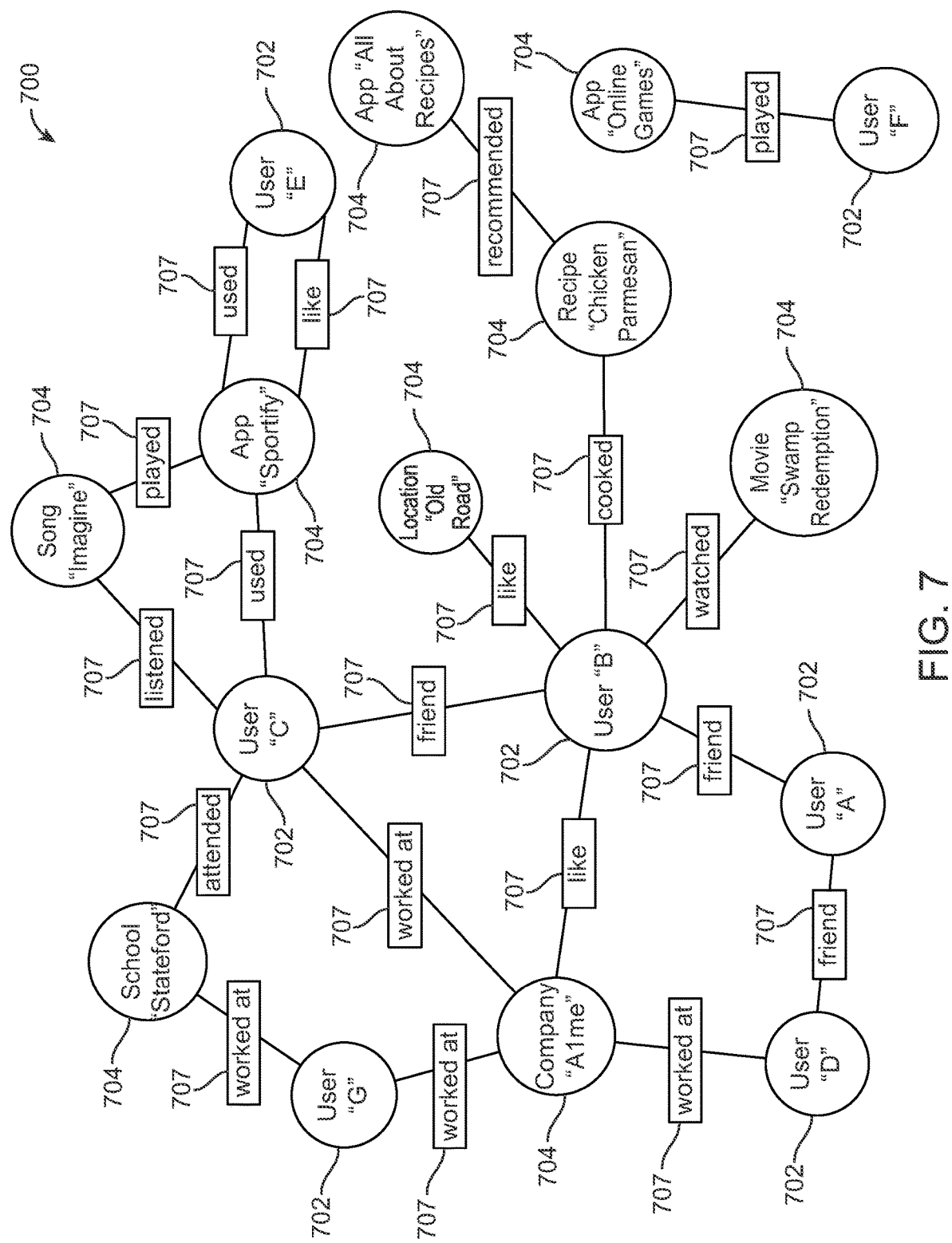
FIG. 7 illustrates an example social graph.

FIG. 7 illustrates an example social graph 700. In particular embodiments, the social-networking system 160 may store one or more social graphs 700 in one or more data stores. In particular embodiments, the social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. The example social graph 700 illustrated in FIG. 7 is shown, for didactic purposes, in a two-dimensional visual map representation. In particular embodiments, a social-networking system 160, a client system 130, an assistant system 140, or a third-party system 170 may access the social graph 700 and related social-graph information for suitable applications. The nodes and edges of the social graph 700 may be stored as data objects, for example, in a data store (such as a social-graph database). Such a data store may include one or more searchable or queryable indexes of nodes or edges of the social graph 700.

In particular embodiments, a user node 702 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with the social-networking system 160. In particular embodiments, a user node 702 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more web interfaces.

In particular embodiments, a concept node 704 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more web interfaces.

In particular embodiments, a node in the social graph 700 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 704. Profile interfaces may be viewable by all or a selected subset of other users. As an example and not by way of limitation, a user node 702 may have a corresponding user-profile interface in which the corresponding user may add content, make declarations, or otherwise express himself or herself. As another example and not by way of limitation, a concept node 704 may have a corresponding concept-profile interface in which one or more users may add content, make declarations, or express themselves, particularly in relation to the concept corresponding to concept node 704.

In particular embodiments, a concept node 704 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 702 corresponding to the user and a concept node 704 corresponding to the third-party web interface or resource and store edge 706 in one or more data stores.

In particular embodiments, a pair of nodes in the social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 706 connecting the first user's user node 702 to the second user's user node 702 in the social graph 700 and store edge 706 as social-graph information in one or more of data stores 164. In the example of FIG. 7, the social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile interface corresponding to a concept node 704 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, the social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704).

In particular embodiments, the social-networking system 160 may create an edge 706 between a user node 702 and a concept node 704 in the social graph 700. As an example and not by way of limitation, a user viewing a concept-profile interface (such as, for example, by using a web browser or a special-purpose application hosted by the user's client system 130) may indicate that he or she likes the concept represented by the concept node 704 by clicking or selecting a "Like" icon, which may cause the user's client system 130 to send to the social-networking system 160 a message indicating the user's liking of the concept associated with the concept-profile interface. In response to the message, the social-networking system 160 may create an edge 706 between user node 702 associated with the user and concept node 704, as illustrated by "like" edge 706 between the user and concept node 704. In particular embodiments, the social-networking system 160 may store an edge 706 in one or more data stores. In particular embodiments, an edge 706 may be automatically formed by the social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Vector Spaces and Embeddings

Figure 8:
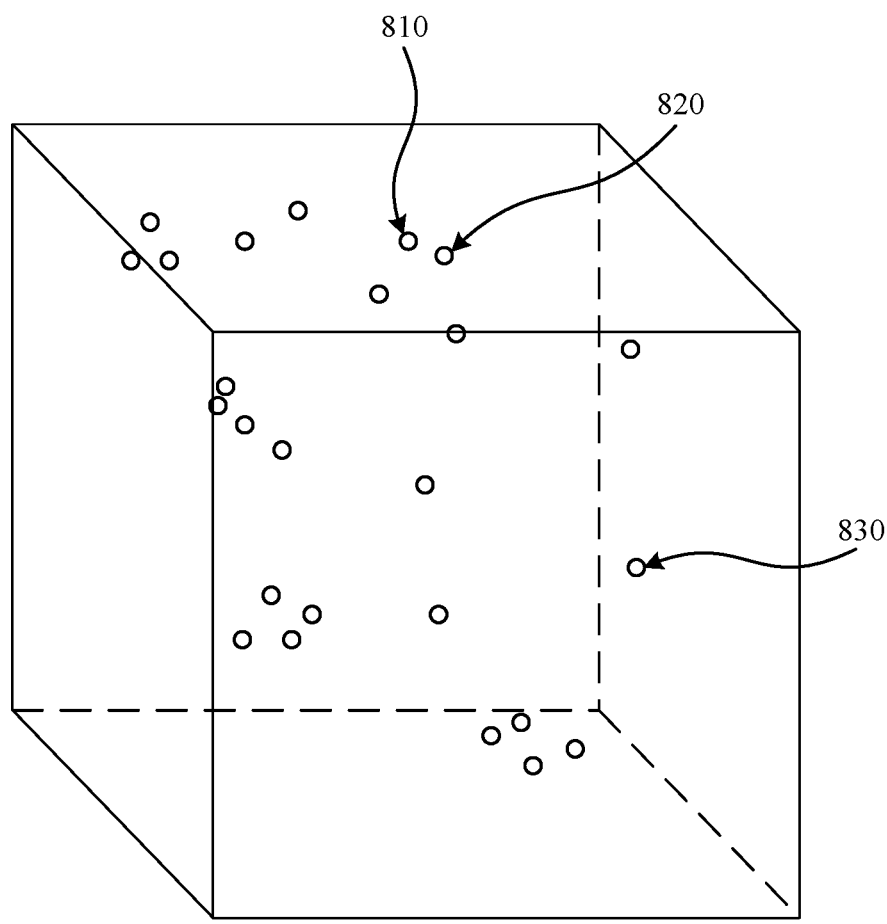
FIG. 8 illustrates an example view of an embedding space.

FIG. 8 illustrates an example view of a vector space 800. In particular embodiments, an object or an n-gram may be represented in a d-dimensional vector space, where d denotes any suitable number of dimensions. Although the vector space 800 is illustrated as a three-dimensional space, this is for illustrative purposes only, as the vector space 800 may be of any suitable dimension. In particular embodiments, an n-gram may be represented in the vector space 800 as a vector referred to as a term embedding. Each vector may comprise coordinates corresponding to a particular point in the vector space 800 (i.e., the terminal point of the vector). As an example and not by way of limitation, vectors 810, 820, and 830 may be represented as points in the vector space 800, as illustrated in FIG. 8. An n-gram may be mapped to a respective vector representation. As an example and not by way of limitation, n-grams $t_1$ and $t_2$ may be mapped to vectors $\vec{v_1}$ and $\vec{v_2}$ in the vector space 800, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 800. In particular embodiments, an n-gram may be mapped to a vector representation in the vector space 800 by using a machine leaning model (e.g., a neural network). The machine learning model may have been trained using a sequence of training data (e.g., a corpus of objects each comprising n-grams).

In particular embodiments, an object may be represented in the vector space 800 as a vector referred to as a feature vector or an object embedding. As an example and not by way of limitation, objects $e_1$ and $e_2$ may be mapped to vectors $\vec{v_1}$ and $\vec{v_2}$ in the vector space 800, respectively, by applying a function $\vec{\pi}$ such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\pi\rightarrow$ may map the object to a vector using a transformed reduced set of features (e.g., feature selection). In particular embodiments, a function $\pi\rightarrow$ may map an object e to a vector $\pi\rightarrow$ (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 800. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\| \vec{v_1} - \vec{v_2} \|$. A similarity metric of two vectors may represent how similar the two objects or n-grams corresponding to the two vectors, respectively, are to one another, as measured by the distance between the two vectors in the vector space 800. As an example and not by way of limitation, vector 810 and vector 820 may correspond to objects that are more similar to one another than the objects corresponding to vector 810 and vector 830, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 9:
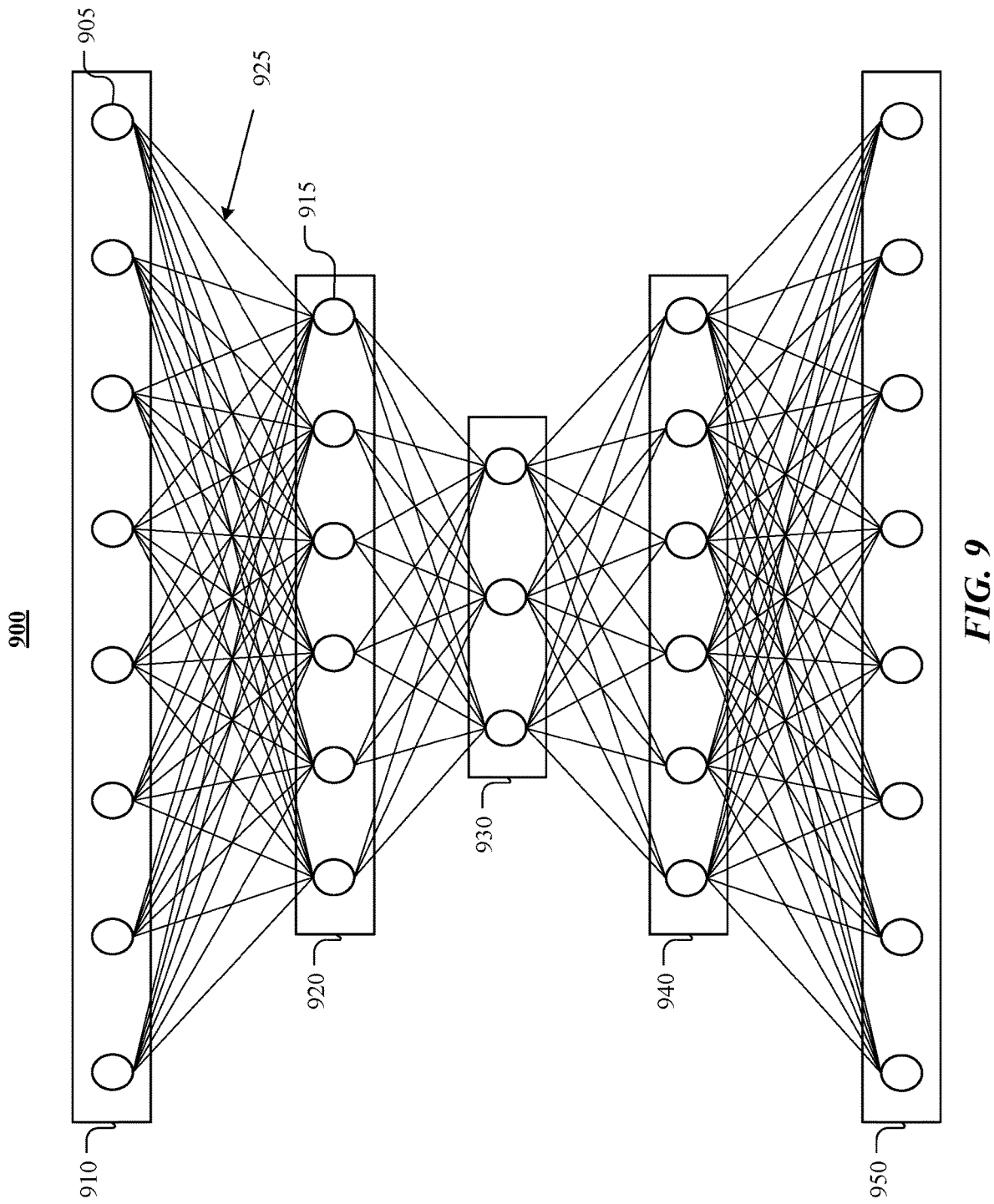
FIG. 9 illustrates an example artificial neural network.

FIG. 9 illustrates an example artificial neural network ("ANN") 900. In particular embodiments, an ANN may refer to a computational model comprising one or more nodes. Example ANN 900 may comprise an input layer 910, hidden layers 920, 930, 960, and an output layer 950. Each layer of the ANN 900 may comprise one or more nodes, such as a node 905 or a node 915. In particular embodiments, each node of an ANN may be connected to another node of the ANN. As an example and not by way of limitation, each node of the input layer 910 may be connected to one of more nodes of the hidden layer 920. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 9 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 9 depicts a connection between each node of the input layer 910 and each node of the hidden layer 920, one or more nodes of the input layer 910 may not be connected to one or more nodes of the hidden layer 920.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 920 may comprise the output of one or more nodes of the input layer 910. As another example and not by way of limitation, the input to each node of the output layer 950 may comprise the output of one or more nodes of the hidden layer 960. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k) = \max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 925 between the node 905 and the node 915 may have a weighting coefficient of 0.4, which may indicate that 0.4 multiplied by the output of the node 905 is used as an input to the node 915. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 900 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 700. A privacy setting may be specified for one or more edges 706 or edge-types of the social graph 700, or with respect to one or more nodes 702, 704 or node-types of the social graph 700. The privacy settings applied to a particular edge 706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 704 connected to a user node 702 of the first user by an edge 706. The first user may specify privacy settings that apply to a particular edge 706 connecting to the concept node 704 of the object, or may specify privacy settings that apply to all edges 706 connecting to the concept node 704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 10:
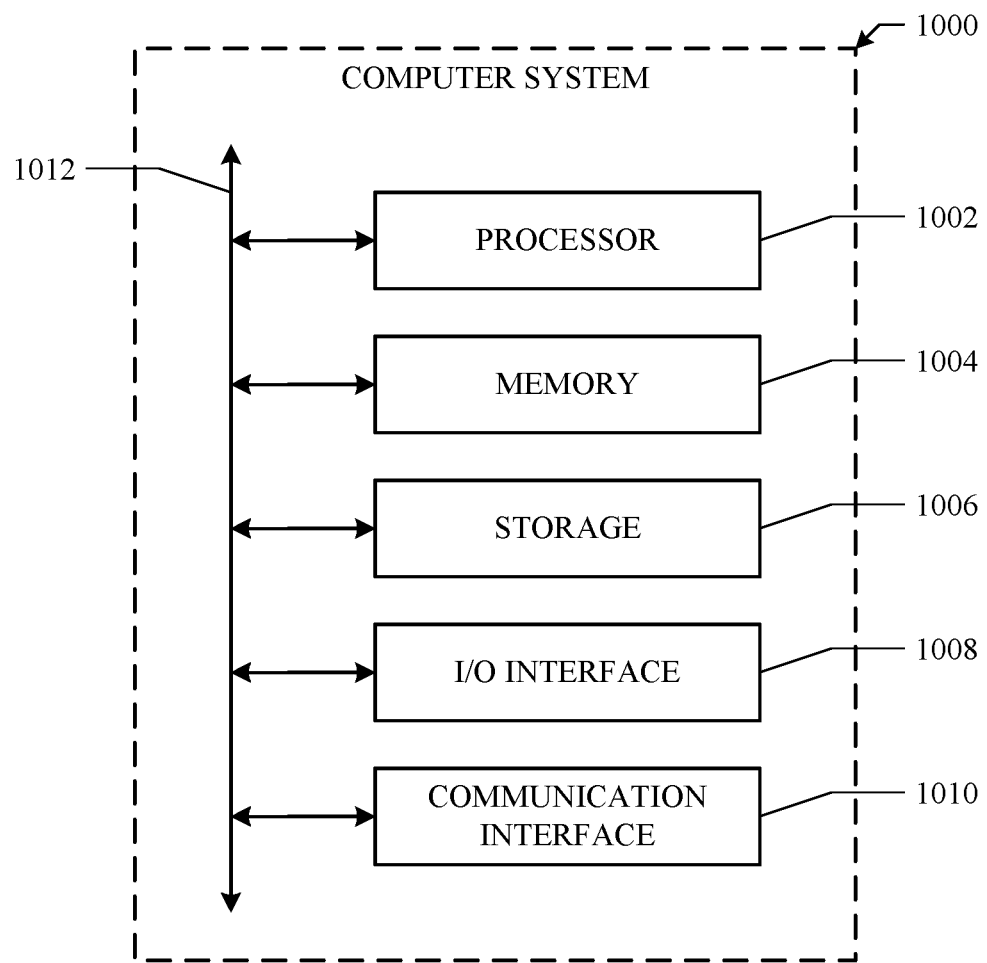
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
  receiving, from a client system associated with a user, a user input;
  generating, by a natural-language generation module, a plurality of candidate responses in response to the user input;
  determining, by a filtering module, for each candidate response of the plurality of candidate responses, a quality-indication for the candidate response based on one or more classification models and one or more classification rules, wherein the one or more classification models and the one or more classification rules each correspond to a respective acceptance-criteria, and wherein the one or more classification rules are based on one or more slots and one or more intents associated with the user input;
  selecting one or more candidate responses from the plurality of candidate responses based on a plurality of quality-indications associated with the plurality of candidate responses, respectively;
  ranking the one or more selected candidate responses based on one or more ranking-criteria; and sending, to the client system associated with the user responsive to receiving the user input, instructions for presenting a top-ranked candidate response to the user.

2. The method of claim 1, wherein one or more of the one or more selected candidate responses is generated by a language-template, wherein the language-template integrates one or more n-grams based on a particular order into a candidate response.

3. The method of claim 1, wherein one or more of the one or more selected candidate responses is generated by an information-retrieval algorithm, wherein the information-retrieval algorithm searches a data store comprising a plurality of responses to identify the one or more of the one or more selected candidate responses.

4. The method of claim 1, wherein one or more of the one or more selected candidate responses is generated by a machine-learning algorithm, wherein the machine-learning algorithm is based on a long-short term memory (LSTM) model.

5. The method of claim 1, wherein the one or more classification models comprise one or more of a grammaticality model, a semantic-correctness model, or a naturalness model.

6. The method of claim 1, further comprising:
training the one or more classification models based on a plurality of training samples, each training sample comprising a pre-generated response and a pre-annotated quality-indication associated with the pre-generated response.

7. The method of claim 1, wherein the one or more classification models are based on gradient boosted decision tree.

8. The method of claim 7, further comprising training the one or more classification models based on a plurality of training samples, wherein training each of the one or more classification models comprises:
training, based on the plurality of training samples, an n-gram based language model for each of the one or more classification models, respectively;
generating, by the respective n-gram based language model, a plurality of intermediate responses for each of the one or more classification models, respectively;
extracting, by the respective n-gram based language model, features of the plurality of respective intermediate responses for each of the one or more classification models, respectively; and
training, based on gradient boosted decision tree, each of the one or more classification models by using the respective features for each of the one or more classification models.

9. The method of claim 1, wherein the one or more classification models are based on one or more convolutional neural networks.

10. The method of claim 1, wherein the one or more classification rules are based on one or more of:
metadata associated with the user input;
a language-structure of the user input;
user profile data associated with the user; or
historical user input from the user and corresponding candidate responses presented to the user.

11. The method of claim 1, further comprising:
determining, by a natural-language understanding module, the one or more slots and the one or more intents associated with the user input.

12. The method of claim 1, further comprising:
determining, based on contextual information associated with the user input, a modality for presenting the top-ranked candidate response to the user.

13. The method of claim 12, wherein the one or more classification rules are based on the determined modality.

14. The method of claim 1, wherein each candidate response of the plurality of candidate responses is associated with a confidence score.

15. The method of claim 14, wherein the one or more ranking-criteria are based on one or more of:
the one or more confidence scores associated with the one or more selected candidate responses; or
a consistence of the one or more selected candidate responses with respect to the user input.

16. The method of claim 14, further comprising:
determining, by the one or more classification models, a threshold score for determining a quality-indication for a candidate response based on the plurality of confidence scores associated with the plurality of candidate responses.

17. One or more computer-readable non-transitory storage media embodying software that is operable when executed to:
receive, from a client system associated with a user, a user input;
generate, by a natural-language generation module, a plurality of candidate responses in response to the user input;
determine, by a filtering module, for each candidate response of the plurality of candidate responses, a quality-indication for the candidate response based on one or more classification models and one or more classification rules, wherein the one or more classification models and the one or more classification rules each correspond to a respective acceptance-criteria, and wherein the one or more classification rules are based on one or more slots and one or more intents associated with the user input;
select one or more candidate responses from the plurality of candidate responses based on a plurality of quality-indications associated with the plurality of candidate responses, respectively;
rank the one or more selected candidate responses based on one or more ranking-criteria; and
send, to the client system associated with the user responsive to receiving the user input, instructions for presenting a top-ranked candidate response to the user.

18. A system comprising: one or more processors; and a non-transitory memory coupled to the one or more processors comprising instructions executable by the one or more processors, the one or more processors operable when executing the instructions to:
receive, from a client system associated with a user, a user input;
generate, by a natural-language generation module, a plurality of candidate responses in response to the user input;
determine, by a filtering module, for each candidate response of the plurality of candidate responses, a quality-indication for the candidate response based on one or more classification models and one or more classification rules, wherein the one or more classification models and the one or more classification rules each correspond to a respective acceptance-criteria, and wherein the one or more classification rules are based on one or more slots and one or more intents associated with the user input;

select one or more candidate responses from the plurality of candidate responses based on a plurality of quality-indications associated with the plurality of candidate responses, respectively;

rank the one or more selected candidate responses based on one or more ranking-criteria; and send, to the client system associated with the user responsive to receiving the user input, instructions for presenting a top-ranked candidate response to the user.

\* \* \* \* \*